(12) United States Patent
Iwasaki et al.

(10) Patent No.: US 10,216,108 B2
(45) Date of Patent: Feb. 26, 2019

(54) TONER PRODUCTION METHOD AND POLYMER

(71) Applicant: CANON KABUSHIKI KAISHA, Tokyo (JP)

(72) Inventors: Yosuke Iwasaki, Abiko (JP); Takeshi Ohtsu, Toride (JP); Kentaro Kamae, Kashiwa (JP); Ryuichiro Matsuo, Moriya (JP); Wakiko Katsumata, Kashiwa (JP); Kenta Mitsuiki, Toride (JP); Masaharu Miura, Toride (JP); Koh Ishigami, Abiko (JP); Yuichi Mizo, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/673,672

(22) Filed: Aug. 10, 2017

(65) Prior Publication Data

US 2018/0052402 A1 Feb. 22, 2018

(30) Foreign Application Priority Data

Aug. 16, 2016 (JP) ................. 2016-159640

(51) Int. Cl.
| | | |
|---|---|---|
| *G03G 9/08* | (2006.01) | |
| *G03G 9/087* | (2006.01) | |
| *C08F 255/02* | (2006.01) | |
| *G03G 9/09* | (2006.01) | |

(52) U.S. Cl.
CPC ............ *G03G 9/081* (2013.01); *C08F 255/02* (2013.01); *G03G 9/0821* (2013.01); *G03G 9/0827* (2013.01); *G03G 9/08755* (2013.01); *G03G 9/08782* (2013.01); *G03G 9/0918* (2013.01)

(58) Field of Classification Search
CPC .... G03G 9/081; G03G 9/0918; G03G 9/0827; G03G 9/08755; G03G 9/0821; C08F 255/02
See application file for complete search history.

(56) References Cited

U.S. PATENT DOCUMENTS

| | | | |
|---|---|---|---|
| 7,279,262 B2 | 10/2007 | Fujikawa et al. | |
| 7,288,348 B2 | 10/2007 | Hayami et al. | |
| 7,396,626 B2 | 7/2008 | Fujikawa et al. | |
| 7,396,629 B2 | 7/2008 | Baba et al. | |
| 7,611,813 B2 | 11/2009 | Ida et al. | |
| 7,629,100 B2 | 12/2009 | Okamoto et al. | |
| 7,858,283 B2 | 12/2010 | Ishigami et al. | |
| 7,927,775 B2 | 4/2011 | Komatsu et al. | |
| 7,939,233 B2 | 5/2011 | Inoue et al. | |
| 8,084,174 B2 | 12/2011 | Hasegawa et al. | |
| 8,114,562 B2 | 2/2012 | Ishigami et al. | |
| 8,137,886 B2 | 3/2012 | Baba et al. | |
| 8,288,069 B2 | 10/2012 | Fujikawa et al. | |
| 8,298,742 B2 | 10/2012 | Okamoto et al. | |
| 8,323,726 B2 | 12/2012 | Naka et al. | |
| 8,921,023 B2 | 12/2014 | Baba et al. | |
| 8,927,188 B2 | 1/2015 | Naka et al. | |
| 8,945,805 B2 | 2/2015 | Baba et al. | |
| 8,974,994 B2 | 3/2015 | Kamae et al. | |
| 8,986,914 B2 | 3/2015 | Fujikawa et al. | |
| 9,034,551 B2 | 5/2015 | Endo et al. | |
| 9,046,800 B2 | 6/2015 | Hotta et al. | |
| 9,058,924 B2 | 6/2015 | Komatsu et al. | |
| 9,063,443 B2 | 6/2015 | Ishigami et al. | |
| 9,075,328 B2 | 7/2015 | Minagawa et al. | |
| 9,152,088 B1 | 10/2015 | Kobori et al. | |
| 9,372,420 B2 | 6/2016 | Mizo et al. | |
| 9,417,540 B2 | 8/2016 | Hashimoto et al. | |
| 9,436,112 B2 | 9/2016 | Iwasaki et al. | |
| 9,665,021 B2 | 5/2017 | Ohtsu et al. | |
| 9,665,023 B2 | 5/2017 | Kamae et al. | |
| 9,671,707 B2 | 6/2017 | Minagawa et al. | |
| 9,969,834 B2 * | 5/2018 | Ohtsu | ............... C08F 255/02 |
| 2012/0094231 A1 * | 4/2012 | Norikane | ............... B01J 2/04 430/137.1 |
| 2012/0264043 A1 * | 10/2012 | Watanabe | ............ G03G 9/0806 430/108.8 |
| 2013/0244159 A1 | 9/2013 | Ishigami et al. | |
| 2013/0288173 A1 | 10/2013 | Hashimoto et al. | |
| 2013/0309603 A1 | 11/2013 | Takahashi et al. | |
| 2014/0113228 A1 | 4/2014 | Shiotari et al. | |
| 2014/0134535 A1 | 5/2014 | Baba et al. | |
| 2014/0137428 A1 | 5/2014 | Takenaka et al. | |

(Continued)

FOREIGN PATENT DOCUMENTS

| | | |
|---|---|---|
| JP | 2007-264349 A | 10/2007 |
| JP | 2011-013548 A | 1/2011 |
| JP | 2013-015830 A | 1/2013 |

*Primary Examiner* — Thorl Chea
(74) *Attorney, Agent, or Firm* — Venable LLP

(57) ABSTRACT

A toner production method including: a melt-kneading step of melt-kneading a resin composition including a binder resin, a colorant, a wax, and a wax dispersant to obtain a melt-kneaded product; and a pulverizing step of pulverizing the melt-kneaded product. Where the temperature of the melt-kneaded product at the end of the melt-kneading step is Tk (° C.), and the softening point of the wax dispersant is Tm (° C.), the relationship of −18≤[Tk−Tm]≤10 is satisfied. The wax dispersant is a polymer in which a styrene acrylic polymer is graft-polymerized to a polyolefin. The styrene acrylic polymer has a monomer unit derived from α-methylstyrene and a monomer unit derived from a cycloalkyl (meth)acrylate.

7 Claims, 1 Drawing Sheet

(56) References Cited

U.S. PATENT DOCUMENTS

| | | |
|---|---|---|
| 2014/0329176 A1 | 11/2014 | Kanno et al. |
| 2016/0334725 A1 | 11/2016 | Katsumata et al. |
| 2017/0058067 A1 | 3/2017 | Ohtsu et al. |
| 2017/0242355 A1 | 8/2017 | Ishigami et al. |

* cited by examiner

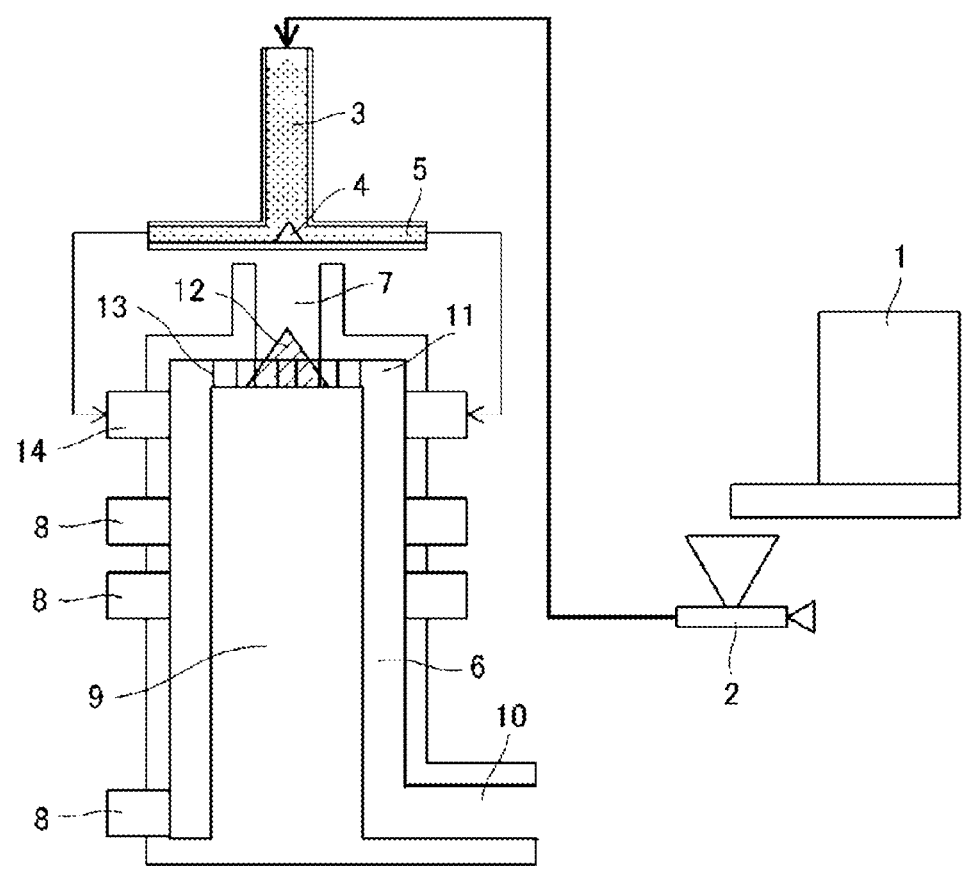

TONER PRODUCTION METHOD AND POLYMER

BACKGROUND OF THE INVENTION

Field of the Invention

The present invention relates to a toner production method and a polymer suitable for an electrophotographic method, an electrostatic recording method, an electrostatic printing method, a toner jet method, and the like.

Description of the Related Art

In recent years, electrophotographic full-color copying machines have become widespread and have also started finding application to a printing market. In the printing market, high speed, high image quality, and high productivity are becoming required while adopting to a wide range of media (types of paper).

For example, the copying machines need to have a constant media velocity, that is, the ability to continue printing without changing the process speed or the set temperature of heating in a fixing device according to the type of paper even if the type of paper is changed from thick paper to thin paper. From the viewpoint of constant media velocity, it is required that fixing of a toner be properly completed in a wide range of fixing temperature from low temperature to high temperature.

In order to fix the toner in a wide range of temperature, a method is used in which wax is included in the toner to impart releasability to the toner. In this case, it is desirable that the dispersion state of the wax in the toner be fine and uniform because the properties of the toner are greatly influenced thereby.

Japanese Patent Application Publication No. 2011-013548 suggests a technique of including a wax dispersant in a toner to control the dispersion state of the wax in the toner.

Further, Japanese Patent Application Publication No. 2007-264349 also suggests to improve the dispersibility of a wax and suppress image deterioration by using a toner binder composed of a high-viscosity resin, a low-viscosity resin, and a dispersant.

However, even when the dispersion state of the wax in the toner is controlled, where the toner is allowed to stand in a high-temperature and high-humidity environment, the wax elutes to the toner surface and the flowability of the toner is lowered. As a result, charging performance may be degraded.

Further, in high-speed machines that are adapted for the printing market, low-temperature fixability is still insufficient and blocking may occur when the toner is allowed to stand at a high temperature. In addition, since the toner shape is not controlled, the transfer efficiency may be insufficient.

Meanwhile, Japanese Patent Application Publication No. 2013-015830 suggests to control the shape of the toner by heat treatment and lower the adhesive force of the toner in order to enhance the transfer efficiency.

SUMMARY OF THE INVENTION

It is known that, in heat-treated toner, the shape of the toner is controlled, but wax with high adhesivity elutes close to the toner surface. Therefore, the flowability of the toner is lowered due to the influence of the wax eluted close to the toner surface, and charging performance may be lowered.

As described above, there is still room for study aimed at controlling the dispersion state of the wax in the toner and satisfying all of the charging performance, low-temperature fixability, and blocking resistance.

In addition, as described above, with a toner using a polyester resin as the main binder, the charging performance or the charge are sometimes more difficult to maintain under a high-temperature and high-humidity environment than with a toner using a styrene acrylic main binder. When the charging performance varies, the tinge tends to fluctuate during image output. This is apparently because moisture is easily adsorbed at the ester bond portion or terminal portion of the polyester resin, and electric charges are dissipated through the adsorbed moisture.

Further, in order to attain high image quality, it is necessary to improve colorant dispersibility. In the toner obtained through the manufacturing method including a melt-kneading step and a pulverizing step, colorant dispersibility can be improved by lowering the temperature during melt-kneading, but a wax dispersant with a high melting point does not melt at a low temperature and wax dispersibility cannot be improved.

The present invention provides a toner production method that solves the above problems.

Specifically, the present invention provides a toner production method capable of satisfying low-temperature fixability, hot offset resistance, and blocking resistance by controlling the dispersion state of the wax in the toner.

The present invention also provides a toner production method that enables the demonstration of sufficient charging performance under a high-temperature and high-humidity environment and the improvement of colorant dispersibility by exposing a wax dispersant having high hydrophobicity on the toner surface.

The present invention provides
a toner production method having:
a melt-kneading step of melt-kneading a resin composition including a binder resin, a colorant, a wax, and a wax dispersant to obtain a melt-kneaded product; and
a pulverizing step of pulverizing the melt-kneaded product, wherein
where a temperature of the melt-kneaded product at an end of the melt-kneading step is Tk (° C.), and
a softening point of the wax dispersant is Tm (° C.),
the Tk and the Tm satisfy the relationship of the following formula (1); and
the wax dispersant is a polymer in which a styrene acrylic polymer is graft-polymerized to a polyolefin; and moreover
the styrene acrylic polymer has a monomer unit derived from α-methylstyrene and a monomer unit derived from a cycloalkyl (meth)acrylate:

$$-18 \leq [Tk-Tm] \leq 10 \qquad \text{formula (1)}.$$

Further, the present invention also provides
a polymer in which a styrene acrylic polymer is graft-polymerized to a polyolefin, wherein
the styrene acrylic polymer has a monomer unit derived from α-methylstyrene and a monomer unit derived from a cycloalkyl (meth)acrylate.

According to the present invention, a toner production method can be provided that enables the demonstration of sufficient charging performance under a high-temperature and high-humidity environment and the improvement of colorant dispersibility, while satisfying low-temperature fixability, hot offset resistance, and blocking resistance.

BRIEF DESCRIPTION OF THE DRAWINGS

The FIGURE is a schematic diagram of a heat treatment apparatus.

Further features of the present invention will become apparent from the following description of exemplary embodiments with reference to the attached drawing.

DESCRIPTION OF THE EMBODIMENTS

The toner production method of the present invention has a melt-kneading step of melt-kneading a resin composition including a binder resin, a colorant, a wax, and a wax dispersant to obtain a melt-kneaded product; and a pulverizing step of pulverizing the melt-kneaded product, wherein where a temperature of the melt-kneaded product at an end of the melt-kneading step is Tk (° C.), and a softening point of the wax dispersant is Tm (° C.), the Tk and the Tm satisfy the relationship of the following formula (1); and the wax dispersant is a polymer in which a styrene acrylic polymer is graft-polymerized to a polyolefin; and moreover the styrene acrylic polymer has a monomer unit derived from α-methylstyrene and a monomer unit derived from a cycloalkyl (meth)acrylate:

$$-18 \leq [Tk-Tm] \leq 10 \qquad \text{formula (1).}$$

In the present invention, the expression "at least XX and not more than YY" or "XX to YY" representing the numerical range means a numerical range including a lower limit and an upper limit which are endpoints, unless specified otherwise.

The wax dispersant is a polymer in which a styrene acrylic polymer is graft-polymerized to a polyolefin. The styrene acrylic polymer has affinity for the binder resin in the toner, and the polyolefin has affinity for the wax in the toner.

For this reason, domains of wax and wax dispersant are formed in the toner, and the wax can be finely dispersed. As a result, low-temperature fixability, hot offset resistance, and blocking resistance can be satisfied.

Further, since the styrene acrylic polymer has a monomer unit derived from a cycloalkyl (meth)acrylate, the wax is finely dispersed in the toner and at the same time the charging performance can be maintained even when the toner is allowed to stand in a high-temperature and high-humidity environment.

The term "monomer unit" refers to a form in which a monomer substance in a polymer or resin has reacted.

As a result of the investigation conducted by the inventors of the present invention, the following mechanism is presumed.

When a toner is produced by the melt-kneading method, cracking is likely to occur at the interface with the wax in the pulverizing step, and the wax is likely to be exposed on the toner surface.

It can be presumed that the wax dispersant forming the domain structure with the wax is also likely to be exposed on the toner surface at this time.

Meanwhile, it is conceivable that since the wax dispersant, that is, a polymer in which a styrene acrylic polymer is graft-polymerized to a polyolefin (hereinafter also referred to simply as a polymer), has a hydrophobic cycloalkyl group, the adsorption of moisture is more likely to be inhibited than with the conventional wax dispersant.

Thus, it is conceivable that, as a result of exposing a large amount of wax dispersant, which is likely to inhibit the adsorption of moisture, on the toner surface, the reduction of the charge amount of the toner by moisture adsorption is suppressed and the charging performance under a high-temperature and high-humidity environment is improved.

Meanwhile, when a cycloalkyl group is introduced into the wax dispersant, the softening point of the wax dispersant increases, but in the case, for example, where the kneading temperature during melt-kneading is set low so as to improve the dispersibility of the colorant, the wax dispersant is not softened and wax dispersibility is sometimes degraded.

Therefore, further investigation has been conducted, and it was found that the softening point of the wax dispersant can be lowered even in a state having a hydrophobic cycloalkyl group by including a monomer unit derived from α-methylstyrene as a constituent component of the styrene acrylic polymer.

As a result, it became possible to satisfy all of the hydrophobicity of the toner surface, and wax dispersibility and colorant dispersibility in the toner.

As a result of the investigation conducted by the inventors of the present invention, the following mechanism is presumed.

It is conceivable that because the styrene acrylic polymer contains a monomer unit derived from α-methylstyrene, depolymerization of α-methylstyrene can be used during the synthesis of the polymer, and the molecular weight is prevented from becoming excessively high.

For this reason, the molecular weight of the polymer can be kept low, and the softening point of the wax dispersant can be lowered. Meanwhile, since the cycloalkyl group is present, it is possible to improve the hydrophobicity.

In the present invention, where the temperature of the melt-kneaded product at the end of the melt-kneading step (hereinafter also referred to as the outlet temperature of the kneaded product) is Tk (° C.), and the softening point of the wax dispersant is Tm (° C.), the Tk and the Tm satisfy the relationship of the following formula (1). It is also preferable that the relationship of the following formula (1)' be satisfied.

$$-18 \leq [Tk-Tm] \leq 10 \qquad \text{formula (1)}$$

$$-15 \leq [Tk-Tm] \leq 10 \qquad \text{formula (1)'}$$

In the present invention, since the softening point of the wax dispersant is controlled to a sufficiently low state, as described above, it is possible to control the outlet temperature of the kneaded product to an appropriate temperature.

In other words, when the Tk and Tm satisfy the relationship of $-18 \leq [Tk-Tm] \leq 10$, the wax dispersant is appropriately or sufficiently softened during melt-kneading of the toner composition, thereby making contribution to the fine dispersion of the wax. Furthermore, it is possible to impart a sufficient shear to the toner composition at the time of melt-kneading, and the colorant dispersibility can also be markedly improved.

More specifically, when [Tk–Tm] is less than −18, the outlet temperature of the kneaded product is lower than the softening point of the wax dispersant, the wax dispersant is not sufficiently softened during melt kneading of the toner composition, and it is difficult to disperse the wax finely.

Meanwhile, where [Tk–Tm] is larger than 10, the outlet temperature of the kneaded product becomes too high when the wax dispersant is sufficiently softened. Therefore, sufficient shear cannot be provided to the toner composition, kneading of the toner composition becomes insufficient, and wax dispersibility and colorant dispersibility are lowered.

Thus, it is conceivable that both hydrophobicity and colorant dispersibility can be realized by introducing the monomer unit derived from α-methylstyrene into the wax dispersant and decreasing the outlet temperature of the kneaded product during melt kneading.

The polymer of the present invention is a polymer in which a styrene acrylic polymer is graft-polymerized to a polyolefin, wherein the styrene acrylic polymer has a monomer unit derived from α-methylstyrene and a monomer unit derived from cycloalkyl (meth)acrylate.

In the present invention, the wax dispersant is the polymer.

The polyolefin is not particularly limited, but from the viewpoint of affinity for the wax in the toner, the polyolefin may be selected from waxes used for the toner described below.

The melting point of the polyolefin is preferably at least 70° C. and not more than 90° C., and more preferably at least 75° C. and not more than 85° C.

The polyolefin can be preferably exemplified by a hydrocarbon wax such as polyethylene, polypropylene, an alkylene copolymer, microcrystalline wax, paraffin wax, and Fischer-Tropsch wax. More preferably, it is polypropylene having a melting point at least 70° C. and not more than 90° C.

In the styrene acrylic polymer, the mass ratio of the polyolefin to the styrene acrylic polymer is preferably 1:99 to 30:70, and more preferably 3:97 to 20:80.

Further, from the viewpoint of reactivity during production of the wax dispersant, it is preferable that the polyolefin have a branched structure like polypropylene.

In the present invention, a method for graft polymerizing the styrene acrylic polymer to the polyolefin is not particularly limited, and a conventionally known method can be used.

In the polymer, the styrene acrylic polymer is not particularly limited, provided that it has a monomer unit derived from α-methylstyrene and a monomer unit derived from cycloalkyl (meth)acrylate. Here, cycloalkyl (meth)acrylate means cycloalkyl acrylate or cycloalkyl methacrylate.

By including a monomer unit derived from α-methylstyrene, it is possible to prevent the molecular weight of the polymer from becoming excessively high and to keep the softening point of the polymer low.

The amount of the monomer unit derived from α-methylstyrene in the polymer is preferably at least 5.0% by mass and not more than 30.0% by mass, and more preferably at least 7.0% by mass and not more than 15.0% by mass.

The monomer unit derived from a cycloalkyl (meth) acrylate can be represented by the following formula (2).

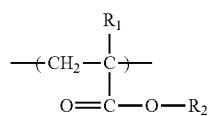

(2)

In the formula (2), $R_1$ represents a hydrogen atom or a methyl group, and $R_2$ represents a cycloalkyl group.

The $R_2$ is preferably a cycloalkyl group having at least 3 and not more than 18 carbon atoms, and more preferably a cycloalkyl group having at least 4 and not more than 12 carbon atoms.

Specific examples of the cycloalkyl group include a cyclopropyl group, a cyclobutyl group, a cyclopentyl group, a cyclohexyl group, a t-butylcyclohexyl group, a cycloheptyl group, a cyclooctyl group, etc.

Further, the cycloalkyl group can also have an alkyl group, a halogen atom, a carboxy group, a carbonyl group, a hydroxy group, etc. as a substituent. The alkyl group is preferably an alkyl group having 1 to 4 carbon atoms.

The position and the number of substituents are arbitrary, and when the cycloalkyl group has at least 2 substituents, the substituents may be the same or different.

Specific examples of the cycloalkyl (meth)acrylate include cyclopropyl acrylate, cyclobutyl acrylate, cyclopentyl acrylate, cyclohexyl acrylate, cycloheptyl acrylate, cyclooctyl acrylate, cyclopropyl methacrylate, cyclobutyl methacrylate, cyclopentyl methacrylate, cyclohexyl methacrylate, cycloheptyl methacrylate, cyclooctyl methacrylate, dihydrocyclopentadiethyl acrylate, dicyclopentanyl acrylate, dicyclopentanyl methacrylate, etc.

Among them, from the viewpoint of hydrophobicity, cyclohexyl acrylate, cycloheptyl acrylate, cyclooctyl acrylate, cyclohexyl methacrylate, cycloheptyl methacrylate, and cyclooctyl methacrylate are preferable. Further, it is more preferable that the monomer unit derived from the cycloalkyl (meth)acrylate be a monomer unit derived from cyclohexyl methacrylate.

The amount of the monomer unit represented by formula (2) in the polymer is preferably at least 1.0% by mass and not more than 40.0% by mass, and more preferably at least 5.0% by mass and not more than 15.0% by mass.

Examples of monomers other than α-methylstyrene and cycloalkyl (meth)acrylate as constituent components of the styrene acrylic polymer are presented below.

Styrene monomers such as styrene, p-methylstyrene, m-methylstyrene, p-methoxystyrene, p-hydroxystyrene, p-acetoxystyrene, vinyltoluene, ethylstyrene, phenylstyrene, benzylstyrene, etc.; alkyl esters of unsaturated carboxylic acids (the number of carbon atoms in the alkyl is at least 1 and not more than 18) such as methyl acrylate, ethyl acrylate, butyl acrylate, 2-ethylhexyl acrylate, methyl methacrylate, ethyl methacrylate, butyl methacrylate, 2-ethylhexyl methacrylate, etc.; vinyl ester monomers such as vinyl acetate, etc.; vinyl ether monomers such as vinyl methyl ether; vinyl monomers including a halogen element, such as vinyl chloride; and diene monomers such as butadiene, isobutylene, etc. These monomers can be used singly or in combination of two or more kinds.

The amount of the monomer unit derived from the styrene monomer in the polymer is preferably at least 50.0% by mass and not more than 85.0% by mass, and more preferably at least 60.0% by mass and not more than 80.0% by mass.

Further, from the viewpoint of low-temperature fixability of the toner, it is preferable that the polymer have a monomer unit represented by the following formula (3).

When the polymer has a monomer unit represented by the following formula (3), the glass transition temperature (Tg) of the polymer can be lowered. As a result, when the wax dispersant is included in the toner, the charging performance is unlikely to be lowered even when the toner is allowed to stand under a high-temperature and high-humidity environment, and the low-temperature fixability is further improved.

The amount of the monomer unit represented by the following formula (3) in the polymer is preferably at least 5.0% by mass and not more than 30.0% by mass, more preferably at least 10.0% by mass and not more than 20.0% by mass.

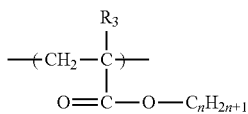

(3)

In the formula (3), $R_3$ represents a hydrogen atom or a methyl group, and n represents an integer of at least 1 and not more than 18.

It is more preferable that n be an integer of at least 2 and not more than 7. When n is an integer of at least 2 and not more than 7, the glass transition temperature (Tg) can be efficiently decreased.

It is preferable that the softening point of the polymer, that is, the softening point of the wax dispersant be at least 100.0° C. and not more than 130.0° C., and more preferably at least 105.0° C. and not more than 125.0° C.

The weight average molecular weight (Mw) of the polymer is preferably at least 5000 and not more than 70,000, and more preferably at least 10,000 and not more than 50,000.

When the weight average molecular weight of the polymer is in the above range, the movement of the polymer in the toner becomes appropriate. As a result, the wax dispersibility is further improved, elution of the wax to the toner surface in a high-temperature and high-humidity environment becomes appropriate, and the blocking resistance of the toner is further improved.

Further, at the time of fixing and melting, the wax finely dispersed in the toner can be rapidly transferred to the toner surface, and hot offset resistance is further improved.

The amount of the polymer is preferably at least 1.0 part by mass and not more than 10.0 parts by mass, and more preferably at least 2.0 parts by mass and not more than 8.0 parts by mass with respect to 100 parts by mass of the binder resin.

In the case of producing a toner by using the wax dispersant, the binder resin is not particularly limited, but in order to further exert the effect of the wax dispersant, it is preferable that the binder resin include an amorphous polyester resin.

The amount of the amorphous polyester resin in the binder resin is preferably at least 50% by mass, more preferably at least 70% by mass, and even more preferably at least 90% by mass.

The compatibility between the amorphous polyester resin and the wax is inherently poor. Therefore, when wax is added as is to obtain a toner, the wax is present in the segregated state in the toner, and free wax and the like are also generated. As a result, problems such as poor charging can occur.

However, since the toner includes the wax dispersant, and the binder resin includes the amorphous polyester resin, the dispersion state of the wax in the toner can be controlled.

The amorphous polyester resin can be produced according to a usual polyester synthesis method.

Examples of the monomers suitable for producing the amorphous polyester resin include polyhydric alcohols (dihydric or trihydric or higher alcohols), polyvalent carboxylic acids (divalent or trivalent or higher carboxylic acids), and acid anhydrides thereof or lower alkyl esters thereof.

Here, in the case of preparing a branched polymer, partial crosslinking within the molecule of the amorphous polyester resin is effective, and for this purpose, a polyfunctional compound having a valence of three or more is preferably used. Thus, trivalent or higher carboxylic acids, anhydrides thereof, or lower alkyl esters thereof and/or trihydric or higher alcohols may be included as monomers.

Examples of the polyhydric alcohols and the polyvalent carboxylic acids suitable for producing the amorphous polyester resin are presented hereinbelow.

Examples of dihydric alcohols include ethylene glycol, propylene glycol, 1,3-butanediol, 1,4-butanediol, 2,3-butanediol, diethylene glycol, triethylene glycol, 1,5-pentanediol, 1,6-hexanediol, neopentyl glycol, 2-ethyl-1,3-hexanediol, hydrogenated bisphenol A, bisphenols represented by the following formula (A) and derivatives thereof, and diols represented by the following formula (B).

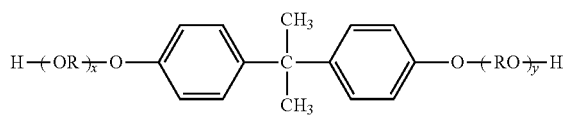

(A)

In the formula, R is an ethylene group or a propylene group, and x and y are each an integer of at least 0, the average value of x+y being at least 0 and not more than 10.

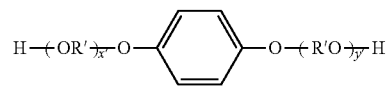

(B)

In the formula, R' is

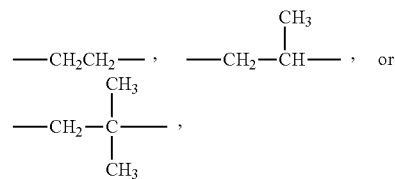

and x' and y' are each an integer of at least 0, the average value of x'+y' being at least 0 and not more than 10.)

Examples of divalent carboxylic acids include maleic acid, fumaric acid, citraconic acid, itaconic acid, glutaconic acid, phthalic acid, isophthalic acid, terephthalic acid, succinic acid, adipic acid, sebacic acid, azelaic acid, malonic acid, n-dodecenylsuccinic acid, isododecenylsuccinic acid, n-dodecylsuccinic acid, isododecylsuccinic acid, n-octenylsuccinic acid, n-octylsuccinic acid, isooctenylsuccinic acid, and isooctylsuccinic acid. Acid anhydrides and lower alkyl esters thereof may also be used.

Among them, maleic acid, fumaric acid, terephthalic acid, adipic acid, and n-dodecenylsuccinic acid are preferably used.

Examples of trihydric or higher alcohols include sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, 2-methylpropanetriol, 2-methyl-1,2,4-butanetriol, trimethylolethane, trimethylolpropane, and 1,3,5-trihydroxymethylbenzene.

Among them, glycerol, trimethylolpropane, and pentaerythritol are preferably used.

Examples of trivalent and higher carboxylic acids include 1,2,4-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, 1,2,4-cyclohexanetricarboxylic acid, tetra(methylenecarboxyl)methane, 1,2,7,8-octanetetracarboxylic acid, pyromellitic acid, and empol trimer acid. Acid anhydrides and lower alkyl esters thereof may also be used.

Among them, 1,2,4-benzenetricarboxylic acid (trimellitic acid) or derivatives thereof are preferably used because they are inexpensive and the reaction control can be easily performed.

The dihydric alcohols and the trihydric or higher alcohols can be used singly or in combination of a plurality thereof. Likewise, the divalent carboxylic acids and the trivalent or higher carboxylic acids can be used singly or in combination of a plurality thereof.

The binder resin may be a hybrid resin. For example, the binder resin may be a hybrid resin of an amorphous polyester resin and a vinyl resin or a vinyl copolymer. In this case, the amount of the amorphous polyester resin in the hybrid resin is preferably at least 50% by mass, and more preferably at least 70% by mass.

Methods for obtaining a reaction product of a vinyl resin or a vinyl copolymer and an amorphous polyester resin are exemplified by a method in which a polymerization reaction of one or both resins is performed in the presence of a polymer including a monomer component reactable with the vinyl resin (or vinyl copolymer) or the amorphous polyester resin, respectively.

For example, among the monomers constituting amorphous polyester resins, those reactable with the vinyl resins or vinyl copolymers include unsaturated dicarboxylic acids such as phthalic acid, maleic acid, citraconic acid, itaconic acid and anhydrides thereof.

Among the monomers constituting vinyl resins or the vinyl copolymers, those reactable with amorphous polyester resin components include those having a carboxy group or a hydroxy group, and acrylic acid esters or methacrylic acid esters.

A resin other than the amorphous polyester resin can also be used as the binder resin to the extent that the effect of the present invention is not impaired.

The resin is not particularly limited, and resins used as binder resins of toners can be used. Examples of such resins include phenolic resins, natural resin-modified phenolic resins, natural resin-modified maleic resins, acrylic resins, methacrylic resins, polyvinyl acetate resins, silicone resins, polyurethane resins, polyamide resins, furan resins, epoxy resins, xylene resins, polyvinyl butyral, terpene resins, coumarone-indene resins, petroleum-based resin, etc.

In the molecular weight distribution measured by gel permeation chromatography (GPC) of tetrahydrofuran (THF) soluble matter of the amorphous polyester resin, the peak molecular weight is preferably at least 5000 and not more than 13,000. From the viewpoints of low-temperature fixability and hot offset resistance, it is preferable to satisfy the above range.

Further, the binder resin may include an amorphous polyester resin (L) having a low molecular weight and an amorphous polyester resin (H) having a high molecular weight.

In this case, from the viewpoints of low-temperature fixability and hot offset resistance, it is preferable that the amount ratio (H/L) of the amorphous polyester resin (H) having a high molecular weight and the amorphous polyester resin (L) having a low molecular weight be at least 10/90 and not more than 60/40.

From the viewpoint of hot offset resistance, it is preferable that the peak molecular weight of the amorphous polyester resin (H) having a high molecular weight be at least 7000 and not more than 15,000. From the viewpoint of charging performance under a high-temperature and high-humidity environment, it is preferable that the acid value of the amorphous polyester resin (H) having a high molecular weight be at least 2 mg KOH/g and not more than 20 mg KOH/g.

Meanwhile, from the viewpoint of low-temperature fixability, it is preferable that the amorphous polyester resin (L) having a low molecular weight have a peak molecular weight of at least 3000 and not more than 6000. From the viewpoint of charging performance under a high-temperature and high-humidity environment, it is preferable that the acid value of the amorphous polyester resin (L) having a low molecular weight be not more than 10 mg KOH/g.

The toner of the present invention may include a crystalline resin. By including the crystalline resin, the low-temperature fixability is further improved.

Examples of crystalline resins include crystalline ester compounds and crystalline ether compounds.

By using a crystalline ester compound or a crystalline ether compound, it is possible to plasticize the amorphous polyester resin of the binder resin and further improve the low-temperature fixability. Further, in order to sufficiently exert the plasticizing effect, it is preferable to use a crystalline polyester resin.

The crystalline polyester resin is obtained, for example, by a polycondensation reaction of a monomer composition including an aliphatic diol and an aliphatic dicarboxylic acid as main components.

It is preferable that the crystalline polyester resin be obtained by polycondensation of an alcohol component including at least one compound selected from the group consisting of aliphatic diols having at least 2 and not more than 22 carbon atoms and derivatives thereof and a carboxylic acid component including at least one compound selected from the group consisting of aliphatic dicarboxylic acids having at least 2 and not more than 22 carbon atoms and derivatives thereof.

Among them, from the viewpoints of low-temperature fixability and blocking resistance, a crystalline polyester resin is preferred which is obtained by polycondensation of an alcohol component including at least one compound selected from the group consisting of aliphatic diols having at least 6 and not more than 12 carbon atoms and derivatives thereof and a carboxylic acid component including at least one compound selected from the group consisting of aliphatic dicarboxylic acids having at least 6 and not more than 12 carbon atoms and derivatives thereof.

The aliphatic diol is not particularly limited, but it is preferably a chain (preferably, linear-chain) aliphatic diol.

Examples of such diols include ethylene glycol, diethylene glycol, triethylene glycol, 1,2-propanediol, 1,3-propanediol, dipropylene glycol, 1,4-butanediol, 1,4-butadiene glycol, 1,5-pentanediol, neopentyl glycol, 1,6-hexanediol, 1,7-heptanediol, 1,8-octanediol, 1,9-nonanediol, 1,10-decanediol, 1,11-undecanediol and 1,12-dodecanediol.

The preferred examples among them include linear-chain aliphatic $\alpha,\omega$-diols such as 1,6-hexanediol, 1,7-heptanediol, 1,8-octanediol, 1,9-nonanediol, 1,10-decanediol, 1,11-undecanediol and 1,12-dodecanediol. Further, the derivatives are not particularly limited, provided that a similar resin structure can be obtained by the polycondensation. Examples thereof include derivatives obtained by esterifying the above diols.

In the alcohol component constituting the crystalline polyester resin, at least one compound selected from the group consisting of aliphatic diols having at least 2 and not more than 22 carbon atoms (preferably at least 6 and not more than 12 carbon atoms) and derivatives thereof is used in an amount preferably at least 50% by mass, and more preferably at least 70% by mass with respect to the entire alcohol component.

Polyhydric alcohols other than aliphatic diols can also be used.

Among the polyhydric alcohols, examples of diols other than the aliphatic diols include aromatic alcohols such as polyoxyethylenated bisphenol A and polyoxypropylenated bisphenol A; 1,4-cyclohexanedimethanol, etc.

Examples of trihydric and higher polyhydric alcohols among the polyhydric alcohols include aromatic alcohols such as 1,3,5-trihydroxymethylbenzene, etc.; and aliphatic alcohols such as pentaerythritol, dipentaerythritol, tripentaerythritol, 1,2,4-butanetriol, 1,2,5-pentanetriol, glycerin, 2-methylpropanetriol, 2-methyl-1,2,4-butanetriol, trimethylolethane, and trimethylolpropane.

Furthermore, monovalent alcohols may be used to such an extent that properties of the crystalline polyester resin are not impaired. Examples of the monohydric alcohols include n-butanol, isobutanol, sec-butanol, n-hexanol, n-octanol, lauryl alcohol, 2-ethylhexanol, decanol, cyclohexanol, benzyl alcohol, dodecyl alcohol, etc.

Meanwhile, the aliphatic dicarboxylic acid is not particularly limited, but it is preferably a chain (preferably linear-chain) aliphatic dicarboxylic acid.

Examples of such aliphatic dicarboxylic acids include oxalic acid, malonic acid, succinic acid, glutaric acid, adipic acid, pimelic acid, suberic acid, glutaconic acid, azelaic acid, sebacic acid, nonanedicarboxylic acid, decanedicarboxylic acid, undecanedicarboxylic acid, dodecanedicarboxylic acid, maleic acid, fumaric acid, mesaconic acid, citraconic acid, and itaconic acid.

Compounds obtained by hydrolyzing anhydrides or lower alkyl esters of these acids can be also used. Further, the derivatives are not particularly limited, provided that a similar resin structure can be obtained by the polycondensation. Examples thereof include derivatives obtained by methylesterification, ethylesterification, or acid chloride conversion of the dicarboxylic acid components and acid anhydrides of the dicarboxylic acid components.

In the carboxylic acid component constituting the crystalline polyester resin, at least one compound selected from the group consisting of aliphatic dicarboxylic acids having at least 2 and not more than 22 carbon atoms (preferably at least 6 and not more than 12 carbon atoms) and derivatives thereof is used in an amount preferably at least 50% by mass, and more preferably at least 70% by mass with respect to the entire carboxylic acid component.

Polyvalent carboxylic acids other than the aliphatic dicarboxylic acids can also be used.

Among the polyvalent carboxylic acids, examples of divalent carboxylic acids other than the abovementioned aliphatic dicarboxylic acids include aromatic carboxylic acids such as isophthalic acid, terephthalic acid, etc.; aliphatic carboxylic acids such as n-dodecylsuccinic acid, n-dodecenylsuccinic acid, etc.; and alicyclic carboxylic acids such as cyclohexanedicarboxylic acid, etc. and also acid anhydrides or lower alkyl esters thereof.

Further, among other polyvalent carboxylic acids, examples of trivalent and higher polyvalent carboxylic acids include aromatic carboxylic acids such as 1,2,4-benzenetricarboxylic acid (trimellitic acid), 2,5,7-naphthalenetricarboxylic acid, 1,2,4-naphthalenetricarboxylic acid, pyromellitic acid, etc., and aliphatic carboxylic acids such as 1,2,4-butanetricarboxylic acid, 1,2,5-hexanetricarboxylic acid, 1,3-dicarboxyl-2-methyl-2-methylenecarboxypropane, etc., and also derivatives such as lower alkyl esters and acid anhydrides thereof.

A monovalent carboxylic acid may be also included to the extent that properties of the crystalline polyester resin are not impaired. Examples of monovalent carboxylic acids include benzoic acid, naphthalenecarboxylic acid, salicylic acid, 4-methylbenzoic acid, 3-methylbenzoic acid, phenoxyacetic acid, biphenylcarboxylic acid, acetic acid, propionic acid, butyric acid, octanoic acid, decanoic acid, dodecanoic acid, stearic acid, etc.

The crystalline polyester resin can be produced according to a usual polyester synthesis method. For example, a crystalline polyester resin can be obtained by esterifying or transesterifying the carboxylic acid component and the alcohol component and then performing polycondensation by a conventional method under reduced pressure or by introducing nitrogen gas.

The esterification or transesterification reaction can be carried out by using, as necessary, a usual esterification catalyst or a transesterification catalyst such as sulfuric acid, titanium butoxide, tin 2-ethylhexanoate, dibutyltin oxide, manganese acetate, magnesium acetate, etc.

Further, the polycondensation reaction may be carried out in the presence of a usual polymerization catalyst, for example, a well-known catalyst such as titanium butoxide, tin 2-ethylhexanoate, dibutyltin oxide, tin acetate, zinc acetate, tin disulfide, antimony trioxide, germanium dioxide, etc. The polymerization temperature and the catalyst amount are not particularly limited, and may be determined as appropriate.

In the esterification or transesterification reaction or polycondensation reaction, in order to increase the strength of the obtained crystalline polyester resin, all the monomers may be loaded at once, or a method may be used in which a divalent monomer is initially reacted in order to reduce the amount of component having a low molecular weight and then a trivalent or higher monomer is added and reacted.

The amount of the crystalline polyester resin is preferably at least 1.0 part by mass and not more than 15.0 parts by mass, and more preferably at least 2.0 parts by mass and not more than 10.0 parts by mass with respect to 100 parts by mass of the binder resin. When the amount of the crystalline polyester resin is within the abovementioned range, the low-temperature fixability is improved.

A wax used in the toner production method is not particularly limited, and suitable examples thereof are presented hereinbelow.

Hydrocarbon waxes such as low-molecular-weight polyethylene, low-molecular-weight polypropylene, alkylene copolymers, microcrystalline wax, paraffin wax and Fischer-Tropsch wax; oxides of hydrocarbon waxes such as oxidized polyethylene wax, or block copolymers thereof; waxes mainly composed of fatty acid esters such as carnauba wax; and waxes obtained by partially or entirely deacidifying fatty acid esters, such as deacidified carnauba wax.

Other examples are presented hereinbelow. Saturated linear-chain fatty acids such as palmitic acid, stearic acid and montanic acid; unsaturated fatty acids such as brassidic acid, eleostearic acid, and parinaric acid; saturated alcohols such as stearyl alcohol, aralkyl alcohol, behenyl alcohol, carnaubyl alcohol, ceryl alcohol, and melissyl alcohol; polyhydric alcohols such as sorbitol; esters of fatty acids such as palmitic acid, stearic acid, behenic acid, and montanic acid with alcohols such as stearyl alcohol, aralkyl alcohol, behenyl alcohol, carnaubyl alcohol, ceryl alcohol, and melissyl alcohol; fatty acid amides such as linoleic acid amide, oleic acid amide, and lauric acid amide; saturated fatty acid bisamides such as methylene bis-stearic acid amide, ethylene bis-caproic acid amide, ethylene bis-lauric acid amide, and hexamethylene bis-stearic acid amide; unsaturated fatty acid amides such as ethylene bis-oleic acid amide, hexamethylene bis-oleic acid amide, N,N'-dioleyladipic acid amide, and N,N'-dioleylsebacic acid amide; aromatic bisamides such as m-xylene bis-stearic acid amide and N,N'-distearylisophthalic acid amide; aliphatic metal salts (generally referred to as metal soaps) such as calcium stearate, calcium laurate, zinc stearate, and magnesium stearate; partial esterification products of fatty acids and polyhydric alcohols such as behenic acid monoglyceride; and methyl ester compounds having a hydroxyl group obtained by hydrogenation of vegetable fats and oils.

Among these waxes, from the viewpoint of further improving the interaction with a wax dispersant, low-temperature fixability, and hot offset resistance, hydrocarbon waxes such as paraffin waxes and Fischer-Tropsch wax, and waxes mainly composed of fatty acid ester waxes such as carnauba wax are preferable. From the viewpoint of further improvement of the hot offset resistance, hydrocarbon waxes are more preferable.

The amount of the wax is preferably at least 1.0 part by mass and not more than 20.0 parts by mass with respect to 100 parts by mass of the binder resin.

From the viewpoint of achieving both blocking resistance and hot offset resistance of the toner, it is preferable that the peak temperature of the maximum endothermic peak measured using a differential scanning calorimetry (DSC) device be at least 45° C. and not more than 140° C., and more preferably at least 70° C. and not more than 100° C.

A colorant used in the toner production method is not particularly limited, and suitable examples thereof are presented hereinbelow.

Carbon black and colorants obtained by color-matching using a yellow colorant, a magenta colorant, and a cyan colorant to give a black color can be used as the colorants for black toner. A pigment may be used alone as the colorant, but from the viewpoint of image quality of a full-color image, it is more preferable that a dye and a pigment be used in combination to improve the sharpness thereof.

Examples of pigments for a magenta toner are presented below. C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 146, 147, 150, 163, 184, 202, 206, 207, 209, 238, 269, and 282; C.I. Pigment Violet 19; C.I. Vat Red 1, 2, 10, 13, 15, 23, 29, and 35.

Examples of dyes for a magenta toner are presented below. C.I. Solvent Red 1, 3, 8, 23, 24, 25, 27, 30, 49, 81, 82, 83, 84, 100, 109, 121; C.I. Disperse Red 9; C.I. Solvent Violet 8, 13, 14, 21, 27; oil-soluble dyes such as C.I. Disperse Violet 1; and basic dyes such as C.I. Basic Red 1, 2, 9, 12, 13, 14, 15, 17, 18, 22, 23, 24, 27, 29, 32, 34, 35, 36, 37, 38, 39, 40; C.I. Basic Violet 1, 3, 7, 10, 14, 15, 21, 25, 26, 27, and 28.

Examples of pigments for a cyan toner are presented below. C.I. Pigment Blue 2, 3, 15:2, 15:3, 15:4, 16, 17; C.I. Vat Blue 6; C.I. Acid Blue 45, and a copper phthalocyanine pigment in which 1 to 5 phthalimidomethyl groups are substituted in the phthalocyanine skeleton.

C.I. Solvent Blue 70 can be used as a dye for a cyan toner.

Examples of pigments for a yellow toner are presented below. C.I. Pigment Yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181, and 185; C.I. Vat Yellow 1, 3, and 20.

C.I. Solvent Yellow 162 can be used as a dye for a yellow toner.

The amount of the colorant is preferably at least 0.1 part by mass and not more than 30.0 parts by mass with respect to 100 parts by mass of the binder resin.

In the toner production method, a charge control agent may be used as necessary.

A known charge control agent can be used as the charge control agent, but a metal compound of an aromatic carboxylic acid which is colorless, has a high charging speed of the toner, and can stably maintain a constant charge amount is particularly preferable.

Examples of negative charge control agents include metal compounds of salicylic acid, metal compounds of naphthoic acid, metal compounds of dicarboxylic acid, polymer compounds having sulfonic acid or carboxylic acid in a side chain, polymer compounds having a sulfonic acid salt or a sulfonic acid esterification product in a side chain, polymer compounds having a carboxylic acid salt or a carboxylic acid esterification product in a side chain, boron compounds, urea compounds, silicon compounds, and calixarenes.

Examples of positive charge control agents include quaternary ammonium salts, polymer compounds having the quaternary ammonium salt in a side chain, guanidine compounds, and imidazole compounds.

The charge control agent may be added to the toner internally or externally.

The amount of the charge control agent is preferably at least 0.2 parts by mass and not more than 10.0 parts by mass with respect to 100 parts by mass of the binder resin.

In the toner production method, inorganic fine particles may be used as necessary.

The inorganic fine particles may be internally added to the toner or may be mixed with the toner as an external additive.

When the inorganic fine particles are included as an external additive, inorganic fine particles such as silica fine particles, titanium oxide fine particles and aluminum oxide fine particles are preferable.

The inorganic fine particles are preferably hydrophobized with a hydrophobic agent such as a silane compound, silicone oil or a mixture thereof.

When the inorganic fine particles are used for improving the flowability of the toner, it is preferable that the inorganic fine particles have a specific surface area of at least 50 $m^2/g$ and not more than 400 $m^2/g$.

Meanwhile, when the inorganic fine particles are used for improving the durability of the toner, the specific surface area is preferably at least 10 $m^2/g$ and not more than 50 $m^2/g$.

In order to improve the flowability and also stabilize the durability, inorganic fine particles having a specific surface area within the above ranges may be used in combination.

In the case where the inorganic fine particles are included as an external additive, it is preferable that the amount thereof be at least 0.1 parts by mass and not more than 10.0 parts by mass with respect to 100.0 parts by mass of the toner particles. A publicly known mixer such as a Henschel mixer may be used for mixing the toner particles and the inorganic fine particles.

The obtained toner can be used as a mono-component developer, but in order to further improve dot reproducibility and to supply a stable image for a long period of time, it is preferable that the obtained toner be mixed with a magnetic carrier and used as a two-component developer.

Generally publicly known materials can be used as the magnetic carrier, examples thereof including iron oxide; particles of metals such as iron, lithium, calcium, magnesium, nickel, copper, zinc, cobalt, manganese, chromium, and rare earth metals, particles of alloys thereof, and particles of oxides thereof; magnetic bodies such as ferrites; magnetic body dispersed resin carriers (so-called resin carriers) including magnetic bodies and a binder resin that holds the magnetic bodies in a dispersed state, and the like.

When the toner is mixed with a magnetic carrier and used as a two-component developer, the mixing ratio of the magnetic carrier and the toner is preferably such that the toner concentration in the two-component type developer is at least 2% by mass and not more than 15% by mass, and more preferably at least 4% by mass and not more than 13% by mass.

A toner production method includes a melt-kneading step of melt-kneading a resin composition including a binder resin, a colorant, a wax, and a wax dispersant to obtain a melt-kneaded product, and a pulverizing step of pulverizing the melt-kneaded product.

As a result of toner production through the melt-kneading step, the dispersibility of the wax is improved. In the melt-kneading step, the raw materials of the toner (in particular, the binder resin, the wax dispersant, and the wax) are sufficiently mixed by heat and shear, so that the dispersibility of the wax in the toner is improved.

As a result of finely dispersing the wax in the toner, elution of the wax to the toner surface under a high-temperature and high-humidity environment is reduced and the blocking resistance of the toner is improved.

In the pulverizing step, the domains of the wax and the wax dispersant are exposed on the toner surface, whereby the hydrophobicity of the toner is promoted and the charging performance under a high-temperature and high-humidity environment is improved.

It is also preferable that the production method include a step of cooling the obtained melt-kneaded product, pulverizing the resulting cooled product, and heat treating the obtained resin particles.

As a result of including the step of heat treating (hereinafter also referred to as a heat treatment step), the charging performance and blocking resistance are further improved as compared with the use of the conventional wax dispersant.

Normally, when a heat treatment step is implemented, since highly adherent wax is eluted close to the toner surface, the blocking resistance of the toner is lowered and charging defects caused by a reduction in flowability of the toner are likely to occur.

However, when the resin particles including the wax dispersant are heat-treated, since the hydrophobic wax dispersant is transferred to the surface of the resin particles at the same time as the wax, the flowability of the toner does not decrease and the charging performance does not decrease even under a high-temperature and high-humidity environment. Further, since the wax dispersant has a bulky cycloalkyl group, the wax is prevented from exuding during the heat treatment step as compared with the case of using the conventional wax dispersant. For this reason, deterioration of blocking resistance of the toner is suppressed.

The toner production method of the present invention will be described hereinbelow in detail, but this description is not limiting.

First, in a raw material mixing step, prescribed amounts of a binder resin, a colorant, a wax, a wax dispersant and the like are weighed as toner raw materials and blended and mixed to obtain a resin composition (also referred to as a toner composition).

Examples of the apparatuses suitable for the mixing include a Henschel mixer (manufactured by Nippon Coke & Engineering Co., Ltd.); Super Mixer (manufactured by Kawata Mfg Co., Ltd.); Ribocone (manufactured by Okawara Mfg. Co., Ltd.); Nauta mixer, Turbulizer, Cyclomix (Hosokawa Micron Corporation); Spiral Pin mixer (manufactured by Pacific Machinery & Engineering Co., Ltd.); and Loedige Mixer (manufactured by Matsubo Corporation).

Next, the obtained resin composition is melt-kneaded to melt the resin, and a colorant, a wax, a wax dispersant and the like are dispersed therein (melt-kneading step).

Examples of the apparatuses suitable for melt kneading include a TEM type extruder (manufactured by Toshiba Machine Co., Ltd.); a TEX twin-screw kneader (manufactured by The Japan Steel Works, Ltd.); a PCM kneader (manufactured by Ikegai Ironworks Corp.); Kneadex (manufactured by Mitsui Mining Co., Ltd.) and the like. Continuous kneading machines such as single-screw or twin-screw extruders are preferred over batch type kneaders because of suitability thereof for continuous production.

When the temperature of the melt-kneaded product at the end of the melt-kneading step (hereinafter simply referred to as "outlet temperature") is Tk (° C.) and the softening point of the wax dispersant is Tm (° C.), the Tk and Tm satisfy the relationship of the following formula (1).

$$-18 \leq [Tk-Tm] \leq 10 \qquad \text{formula (1)}$$

When the Tk (° C.) and Tm (° C.) satisfy the relationship of the formula (1), as described above, the wax dispersant is appropriately or sufficiently softened when the toner composition is melt-kneaded which can contribute to dispersion. Further, since the softening point of the wax dispersant is controlled to be sufficiently low, the outlet temperature of the kneaded product can also be controlled to an appropriate temperature.

From the viewpoints of wax dispersibility and colorant dispersibility, the outlet temperature of the kneaded product is preferably at least 100° C. and not more than 130° C., and more preferably at least 105° C. and not more than 125° C.

The obtained melt-kneaded product may be rolled with two rolls or the like and cooled by water cooling or the like (cooling step).

The obtained cooled material is pulverized to a desired particle size in the pulverizing step. First, the cooled material is coarsely pulverized with a crusher, a hammer mill, a feather mill or the like, and then finely pulverized with a Kryptron system (manufactured by Kawasaki Heavy Industries, Ltd.), Super Rotor (manufactured by Nisshin Engineering Inc.), etc. to obtain resin particles.

The resultant resin particles may be classified into a desired particle size to obtain toner particles. Examples of devices suitable for classification include Turboplex, Faculty, TSP, and TTSP (manufactured by Hosokawa Micron Corporation) and Elbow-Jet (manufactured by Nittetsu Mining Co., Ltd.).

Further, heat treatment may be performed on the classified resin particles to obtain toner particles.

Furthermore, when coarse particles are present after the heat treatment, if necessary, a step of removing coarse particles by classification or sieving may be included. Examples of devices suitable for classification are presented above. Meanwhile, examples of devices suitable for sieving include Ultrasonic (manufactured by Koei Sangyo Co., Ltd.), Rezona Sieve and Gyroshifter (manufactured by Tokuju Corporation), Turbo Screener (manufactured by Turbo Kogyo Co., Ltd.), and HI-VOLTA (manufactured by Toyo Hitec Co., Ltd.), etc.

Meanwhile, before the heat treatment step, inorganic fine particles or the like may be added, as necessary, to the obtained resin particles. As a method for adding inorganic fine particles and the like, predetermined amounts of resin particles and various known external additives may be blended and then stirred and mixed using a high-speed stirrer that acts with a shearing force on a powder, such as a Henschel mixer and Mechano Hybrid (manufactured by Nippon Coke & Engineering Co., Ltd.) and Super Mixer and Nobilta (manufactured by Hosokawa Micron Corporation), as a device for adding an external additive.

The heat treatment step can be carried out at an arbitrary timing.

A method for carrying out heat treatment on the resin particles by using a heat treatment apparatus shown in the FIGURE will be specifically described hereinbelow.

The resin particles quantitatively supplied by a raw material quantitative supply means 1 are guided to an introduction pipe 3 installed vertically above a raw material supply means by compressed gas adjusted by a compressed gas flow rate adjustment means 2.

The mixture that has passed through the introduction pipe 3 is uniformly dispersed by a conical projecting member 4 provided in the central portion of the raw material supply means and is guided to supply pipes 5 extending radially in eight directions and then guided to a treatment chamber 6 where heat treatment is performed.

At this time, the flow of the resin particles supplied to the treatment chamber 6 is regulated by a regulating means 9 for regulating the flow of the resin particles provided in the treatment chamber 6. Therefore, the resin particles supplied to the treatment chamber 6 are subjected to heat treatment while rotating in the treatment chamber 6, and then cooled.

Hot air for heat treating the supplied resin particles is supplied from a hot air supply means 7, distributed by a distributing member 12, and spirally swirled and introduced into the treatment chamber 6 by a swirling member 13 for swirling hot air. The swirling member 13 for swirling hot air is configured of a plurality of blades, and swirling of the hot air can be controlled by the number and angle of the blades (the reference numeral 11 in the FIGURE stands for a hot air supply means outlet). The temperature of the hot air supplied into the treatment chamber 6 is preferably at least 100° C. and not more than 300° C., and more preferably at least 130° C. and not more than 170° C. at the outlet of the hot air supply means 7. When the temperature at the outlet of the hot air supply means 7 is within the above range, it is possible to treat uniformly the particles while preventing fusion and coalescence of the particles caused by excessive heating of the resin particles.

Hot air is supplied from the hot air supply means 7. Further, the heat-treated resin particles which have been heat-treated are cooled by cold air supplied from a cold air supply means 8. The temperature of the cold air supplied from the cold air supply means 8 is preferably at least −20° C. and not more than 30° C. When the temperature of the cool air is within the above range, it is possible to cool efficiently the heat-treated resin particles and prevent fusion and coalescence of the heat-treated resin particles without impeding uniform heat treatment of the resin particles. Further, the absolute moisture content of cold air is preferably at least 0.5 $g/m^3$ and not more than 15.0 $g/m^3$.

Next, the cooled heat-treated resin particles are collected by the collecting means 10 at the lower end of the treatment chamber 6. A blower (not shown in the FIGURE) is provided at the tip of the collecting means 10, and the resin particles are sucked and conveyed thereby.

Further, a powder particle supply port 14 is provided so that the swirling direction of the supplied resin particles and the swirling direction of the hot air are in the same direction, and the collecting means 10 is provided in the tangential direction on the outer peripheral portion of the treatment chamber 6 so as to maintain the swirling direction of the swirling resin particles. Furthermore, the configuration is such that the cold air supplied from the cold air supply means 8 is supplied horizontally and tangentially from the outer peripheral portion of the apparatus to the inner peripheral surface of the treatment chamber. The swirling direction of the resin particles before the heat treatment which are supplied from the powder particle supply port 14, the swirling direction of the cold air supplied from the cold air supply means 8, and the swirling direction of the hot air supplied from the hot air supply means 7 are all the same. Therefore, turbulent flow does not occur in the treatment chamber, the swirling flow in the apparatus is strengthened, a strong centrifugal force is applied to the resin particles before the heat treatment, and the dispersibility of the resin particles before the heat treatment is further improved. Therefore, heat-treated resin particles having uniform shapes and a small number of coalesced particles can be obtained.

The average circularity of the obtained toner is preferably at least 0.960 and not more than 1.000, and more preferably at least 0.965 and not more than 1.000. When the average circularity of the toner is within the above range, the transfer efficiency of the toner is improved.

Methods for measuring various physical properties of the toner and the raw materials will be described hereinbelow.

<Measurement of Peak Temperature of Endothermic Peak of Wax, Crystalline Resin, Etc.>

The peak temperature (Tp) of the maximum endothermic peak of the wax, crystalline resin, etc. is measured according to ASTM D 3418-82 by using a differential scanning calorimeter "Q1000" (manufactured by TA Instruments).

The melting points of indium and zinc are used for temperature correction of the detection unit of the apparatus, and heat of melting of indium is used for correction of the calorific value.

Specifically, about 5 mg of the sample is accurately weighed and placed in a silver pan to perform one cycle of measurements. An empty silver pan is used as a reference. The measurement conditions are presented below.

Temperature increase rate: 10° C./min.
Measurement start temperature: 20° C.
Measurement end temperature: 180° C.

When the endothermic peak (the endothermic peak derived from the binder resin) does not overlap the endothermic peak of the resin other than the wax and the crystalline resin in the case of using the toner as the sample, the obtained maximum endothermic peak is directly handled as used as the endothermic peak derived from the wax and the crystalline resin.

Meanwhile, in the case of using a toner as a sample, the endothermic peak of the wax and the endothermic peak of the binder resin can be distinguished by extracting the wax from the toner by Soxhlet extraction using a hexane solvent, performing differential scanning calorimetry of the isolated wax, and comparing the obtained endothermic peak with the endothermic peak of the toner.

The maximum endothermic peak, as referred to herein, means a peak at which the endothermic amount becomes maximum when there is a plurality of peaks. Also, the peak temperature of the maximum endothermic peak is taken as the melting point.

<Measurement of Weight Average Molecular Weight (Mw), Etc.>

The molecular weight distribution of the wax dispersant and various resins is measured in the following manner by gel permeation chromatography (GPC).

First, the sample is placed in tetrahydrofuran (THF), allowed to stand for several hours at 25° C., thoroughly shaken, thoroughly mixed with THF, and allowed to stand for at least 12 hours until there is no coalescence of the sample.

The sample in this case is allowed to stay in THF for 24 hours. Thereafter, the resultant solution is passed through a sample treatment filter (pore size at least 0.2 μm and not more than 0.5 μm, for example, Sample Pretreatment Cartridge H-25-2 (manufactured by Tosoh Corporation)) and used as a sample for GPC.

Further, the sample concentration is adjusted to be at least 0.5 mg/mL and not more than 5.0 mg/mL. Measurements are performed under the following conditions by using this sample solution.

The column is stabilized in a heat chamber at 40° C., tetrahydrofuran (THF) is allowed to flow as a solvent at a flow rate of 1 mL per minute into the column at this temperature, and measurements are performed by injecting about 100 μL of the sample solution.

A plurality of commercially available polystyrene gel columns is combined as a column. A combination of shodex GPC KF-801, 802, 803, 804, 805, 806, 807, and 800 P manufactured by Showa Denko K.K. or a combination of TSKgel G1000H ($H_{XL}$), G2000H ($H_{XL}$), G3000H ($H_{XL}$), G4000H ($H_{XL}$), G5000H ($H_{XL}$), G6000H ($H_{XL}$), G7000H ($H_{XL}$) and TSKgurd column manufactured by Tosoh Corporation is used.

In measuring the molecular weight of the sample, the molecular weight distribution of the sample is calculated from the relationship between the logarithmic value of a calibration curve prepared from several monodisperse polystyrene standard samples and the count value.

As a standard polystyrene sample for preparing a calibration curve, a sample having a molecular weight of about $1\times10^2$ to $1\times10^7$ manufactured by Tosoh Corporation or Showa Denko K.K. is used, and at least about 10 standard polystyrene samples are used. The detector uses an RI (refractive index) detector.

<Measurement of Weight Average Particle Diameter (D4) of Toner>

The weight average particle diameter (D4) of the toner is calculated by using a precision particle size distribution measuring apparatus "Coulter Counter Multisizer 3" (registered trademark, manufactured by Beckman Coulter, Inc.), which is based on a pore electrical resistance method and equipped with a 100 μm aperture tube, and dedicated software "Beckman Coulter Multisizer 3 Version 3.51" (manufactured by Beckman Coulter, Inc.) provided with the apparatus to set measurement conditions and analyze measurement data, performing measurements with the number of effective measurement channels of 25,000, and analyzing the measurement data.

An electrolytic aqueous solution used for the measurement is prepared by dissolving special grade sodium chloride in ion-exchanged water to a concentration of about 1% by mass. For example, "ISOTON II" (manufactured by Beckman Coulter, Inc.) can be used.

The dedicated software is set as follows before the measurements and analysis.

On the "CHANGE STANDARD MEASUREMENT METHOD (SOM) SCREEN" of the dedicated software, the total count number of the control mode is set to 50,000 particles, one measurement cycle is performed, and a value obtained by using "STANDARD PARTICLE 10.0 μm" (manufactured by Beckman Coulter, Inc.) is set as a Kd value. The threshold and the noise level are automatically set by pressing the "threshold/noise level measurement button". Further, the current is set to 1600 μA, the gain is set to 2, the electrolytic solution is set to ISOTON II, and "flush aperture tube after measurement" is checked.

On the "SCREEN FOR CONVERSION SETTING FROM PULSE TO PARTICLE DIAMETER" of the dedicated software, the bin interval is set to a logarithmic particle diameter, the particle diameter bin is set to 256 particle diameter bins, and the particle diameter range is set to at least 2 μm and not more than 60 μm.

Specific measurement methods are described below.

(1) Approximately 200 mL of the electrolytic aqueous solution is placed in a 250-mL round-bottom glass beaker specifically designed for Multisizer 3, the beaker is set in the sample stand, and stirring with a stirrer rod is performed counterclockwise at 24 rotations/sec. Dirt and air bubbles in the aperture tube are removed by the "FLUSH OF APERTURE" function of the dedicated software.

(2) Approximately 30 mL of the electrolytic aqueous solution is placed in a glass 100-mL flat-bottom beaker. As a dispersant, a diluted solution, about 0.3 mL, prepared by diluting "Contaminon N" (10% by mass aqueous solution of a neutral detergent of pH 7 for washing precision measuring instruments; composed of a nonionic surfactant, an anionic surfactant, and an organic builder; manufactured by Wako Pure Chemical Industries, Ltd.) by a factor of 3 in terms of mass with ion-exchanged water is added to the electrolytic aqueous solution.

(3) A predetermined amount of ion-exchanged water is placed in a water tank of an ultrasonic disperser "Ultrasonic Dispersion System Tetora 150" (manufactured by Nikkaki Bios Co., Ltd.) with an electrical output of 120 W in which two oscillators with an oscillation frequency of 50 kHz are incorporated with a phase shift of 180 degrees, and about 2 mL of Contaminon N is added into the water tank.

(4) The beaker of (2) is set in a beaker fixing hole of the ultrasonic disperser, and the ultrasonic disperser is actuated. Then, the height position of the beaker is adjusted so that the resonance state of the liquid surface of the electrolytic aqueous solution in the beaker is maximized.

(5) Approximately 10 mg of the toner is added little by little to the electrolytic aqueous solution and dispersed while irradiating the electrolytic aqueous solution in the beaker of (4) with ultrasonic waves. Then, the ultrasonic dispersion process is further continued for 60 seconds. During the ultrasonic dispersion, the water temperature in the water tank is adjusted as appropriate to at least 10° C. and not more than 40° C.

(6) The electrolytic aqueous solution of (5) in which the toner has been dispersed is dropwise added using a pipette to the round-bottom beaker of (1) which has been placed in the sample stand, and the measurement concentration is adjusted to about 5%. Then, measurement is performed until the number of particles to be measured reaches 50,000.

(7) The measurement data are analyzed with the dedicated software provided with the apparatus to calculate the weight average particle diameter (D4). The "AVERAGE DIAMETER" on the "ANALYSIS/VOLUME STATISTICAL VALUE (ARITHMETIC AVERAGE)" screen when set as graph/% by volume with the dedicated software is the weight average particle diameter (D4).

<Measurement of Average Circularity>

The average circularity of the toner is measured under measurement and analysis conditions at the time of a calibration operation with a flow particle image analyzer "FPIA-3000" (manufactured by Sysmex Corporation).

A specific measurement method is as described below. First, about 20 mL of ion-exchanged water from which solid impurities and the like have been removed in advance is poured into a glass vessel. Then, about 0.2 mL of a diluted solution prepared by diluting "Contaminon N" (10% by mass aqueous solution of a neutral detergent of pH 7 for washing precision measuring instruments; composed of a nonionic surfactant, an anionic surfactant, and an organic builder; manufactured by Wako Pure Chemical Industries, Ltd.) by a factor of 3 in terms of mass with ion-exchanged water is added as a dispersant to the vessel. Further, about 0.02 g of a measurement sample is added to the vessel, and the dispersion treatment is performed for 2 minutes with the ultrasonic disperser to obtain a dispersion solution for measurement. At that time, the dispersion solution is appropriately cooled so as to have a temperature of at least 10° C. and not more than 40° C. A desktop ultrasonic cleaning and dispersing unit having an oscillatory frequency of 50 kHz and an electrical output of 150 W (for example, "VS-150" (manufactured by VELVO-CLEAR)) is used as the ultrasonic disperser. A predetermined amount of ion-exchanged water is poured into a water tank, and about 2 ml of the Contaminon N is added to the water tank.

A flow particle image analyzer equipped with a standard objective lens (magnification: 10) is used in the measurement, and a particle sheath "PSE-900A" (manufactured by Sysmex Corporation) is used as a sheath liquid. The dispersion solution prepared in accordance with the abovementioned procedure is introduced into the flow particle image analyzer, and 3000 toner particles are subjected to measurement according to the total count mode in the HPF measurement mode. Then, the average circularity of the toner is determined with a binarization threshold at the time of particle analysis set to 85% and particles to be analyzed limited to ones with a circle-equivalent diameter of at least 1.985 μm and not more than 39.69 μm.

<Measurement of Softening Point of Polymer>

The softening point of the polymer is measured using a constant-load extrusion type capillary rheometer "Flow Characteristic Evaluation Device: Flow Tester CFT-500D" (manufactured by Shimadzu Corporation) according to the manual attached to the device.

In this device, the temperature of the measurement sample filled in a cylinder is raised and the sample is melted while applying a constant load from above the measurement sample with a piston, the melted measurement sample is extruded from a die at the bottom of the cylinder, and a flow curve showing the relationship between the piston descent amount and the temperature at this time can be obtained.

In the present invention, the "melting temperature in a ½ method" described in the manual attached to the "Flow Characteristic Evaluation Device: Flow Tester CFT-500D" is taken as the softening point. The melting temperature in the ½ method is calculated as follows. First, ½ of the difference between the descent amount Smax of the piston at the time when the outflow has ended and the descent amount Smin of the piston at the time when the outflow has started is calculated (this is denoted by X; X=(Smax−Smin)/2). The temperature at the flow curve when the descending amount of the piston at the flow curve is the sum of X and Smin is the melting temperature in the ½ method.

About 1.0 g of the sample is compression-molded at about 10 MPa by using a tablet compacting compressor (NT-100H, manufactured by NPa Systems, Inc.) for about 60 seconds in an environment of 25° C. to obtain the measurement sample of a columnar shape with a diameter of about 8 mm.

Measurement conditions of CFT-500D are as follows.

Test mode: temperature rising method
Starting temperature: 50° C.
Temperature reached: 200° C.
Measurement interval: 1.0° C.
Heating rate: 4.0° C./min
Piston cross section area: 1.000 cm$^2$
Test load (piston load): 10.0 kgf (0.9807 MPa)
Preheating time: 300 seconds
Die hole diameter: 1.0 mm
Die length: 1.0 mm

EXAMPLES

The present invention will be explained hereinbelow in greater detail by examples thereof. The present invention is not intended to be limited to the below-described examples. In the examples, number of parts and % are all based on the mass standard, unless specifically stated otherwise.

Production Example of Polymer 1

A total of 300.0 parts of xylene and 10.0 parts of polypropylene (the peak temperature (melting point) of the maximum endothermic peak at 90° C.) were placed in an autoclave reaction vessel equipped with a thermometer and a stirrer, and sufficiently dissolved. After purging with nitrogen, a liquid mixture of 63.0 parts of styrene, 10.0 parts of α-methylstyrene, 5.0 parts of cyclohexyl methacrylate, 12.0 parts of butyl acrylate, and 250.0 parts of xylene was added dropwise at 180° C. for 3 hours and polymerization was performed. Further, holding at this temperature for 30 minutes was followed by the removal of solvent to obtain Polymer 1. Physical properties of the obtained polymer are shown in Table 1. In the table, Mp represents the peak molecular weight, and Mw represents the weight average molecular weight.

Production Examples of Polymers 2 to 22

Polymers 2 to 22 were obtained in the same manner as in the production example of Polymer 1 except that the conditions in the production example of Polymer 1 were appropriately changed as indicated in Table 1. In order to obtain the addition amount of α-methylstyrene shown in Table 1, the amount of styrene added was adjusted (adjusted so that the raw material composition of the polymer became 100 parts as a whole). Physical properties of the obtained polymers are shown in Table 1.

TABLE 1

| Polymer No. | Polyolefin Type | Polyolefin Melting point (° C.) | α-methylstyrene (mass %) | Cycloalkyl (meth)acrylate Type and number of carbon atoms in alicyclic portion | | Other compounds Type and n in Formula (3) | | Physical properties Softening point (° C.) | Mp | Mw |
|---|---|---|---|---|---|---|---|---|---|---|
| 1 | Polypropylene | 80 | 10.0 | Cyclohexyl methacrylate | 6 | Butyl acrylate | 4 | 115.0 | 11000 | 39000 |
| 2 | Polypropylene | 75 | 10.0 | Cyclohexyl methacrylate | 6 | Butyl acrylate | 4 | 115.0 | 10500 | 36000 |
| 3 | Polypropylene | 85 | 10.0 | Cyclohexyl methacrylate | 6 | Butyl acrylate | 4 | 115.0 | 11200 | 41000 |
| 4 | Polypropylene | 80 | 10.0 | Cyclohexyl methacrylate | 6 | Isobutyl acrylate | 4 | 115.0 | 10000 | 39000 |
| 5 | Polypropylene | 80 | 10.0 | Cyclohexyl methacrylate | 6 | 2-Ethylhexl acrylate | 7 | 115.0 | 11000 | 38000 |
| 6 | Polypropylene | 80 | 10.0 | Cyclohexyl methacrylate | 6 | Ethyl acrylate | 2 | 115.0 | 10000 | 37500 |
| 7 | Polypropylene | 80 | 25.0 | Cyclohexyl methacrylate | 6 | Butyl acrylate | 4 | 105.0 | 9500 | 35000 |
| 8 | Polypropylene | 80 | 7.0 | Cyclohexyl methacrylate | 6 | Butyl acrylate | 4 | 125.0 | 12000 | 43000 |
| 9 | Polypropylene | 60 | 10.0 | Cyclohexyl methacrylate | 6 | Butyl acrylate | 4 | 115.0 | 10500 | 38000 |
| 10 | Polypropylene | 100 | 10.0 | Cyclohexyl methacrylate | 6 | Butyl acrylate | 4 | 115.0 | 11000 | 40000 |
| 11 | Polyethylene | 80 | 10.0 | Cyclohexyl methacrylate | 6 | Butyl acrylate | 4 | 115.0 | 10000 | 35000 |
| 12 | Polypropylene | 80 | 10.0 | Cyclopentyl methacrylate | 5 | Butyl acrylate | 4 | 115.0 | 10000 | 37000 |
| 13 | Polypropylene | 80 | 10.0 | Cyclobutyl methacrylate | 4 | Butyl acrylate | 4 | 115.0 | 10000 | 36000 |
| 14 | Polypropylene | 80 | 10.0 | Cycloheptyl methacrylate | 7 | Butyl acrylate | 4 | 115.0 | 11500 | 39500 |
| 15 | Polypropylene | 80 | 10.0 | Cyclooctyl methacrylate | 8 | Butyl acrylate | 4 | 115.0 | 12000 | 39500 |
| 16 | Polypropylene | 80 | 10.0 | Cyclohexyl methacrylate | 6 | — | — | 115.0 | 10000 | 37500 |
| 17 | Polypropylene | 80 | 35.0 | Cyclohexyl methacrylate | 6 | Butyl acrylate | 4 | 95.0 | 8500 | 32000 |
| 18 | Polypropylene | 80 | 1.0 | Cyclohexyl methacrylate | 6 | Butyl acrylate | 4 | 130.0 | 12500 | 43000 |
| 19 | Polypropylene | 80 | 10.0 | — | — | — | — | 115.0 | 10000 | 35000 |
| 20 | Polypropylene | 80 | — | Cyclohexyl methacrylate | 6 | — | — | 135.0 | 13000 | 49000 |
| 21 | Polyethylene | 80 | 10.0 | Cyclohexyl methacrylate | 6 | — | — | 115.0 | 11000 | 39000 |
| 22 | Polyethylene | 80 | — | — | — | — | — | 135.0 | 13000 | 52000 |

Production Example of Amorphous Polyester Resin (L)

| | |
|---|---|
| Polyoxypropylene (2.2)-2,2-bis(4-hydroxyphenyl)propane (0.20 mol; 100.0 mol % based on the total number of moles of polyhydric alcohol), | 72.0 parts |
| terephthalic acid (0.17 mol; 96.0 mol % based on the total number of moles of polyvalent carboxylic acid), and | 28.0 parts |
| tin 2-ethylhexanoate (esterification catalyst): | 0.5 parts. |

The abovementioned materials were weighed into a reaction vessel equipped with a cooling tube, a stirrer, a nitrogen introducing tube, and a thermocouple.

Next, after purging the reaction vessel with nitrogen gas, the temperature was gradually raised under stirring, and the components were reacted for 4 hours under stirring at a temperature of 200° C.

Further, the pressure inside the reaction vessel was reduced to 8.3 kPa and maintained for 1 hour, followed by cooling to 180° C. and returning to atmospheric pressure.

| | |
|---|---|
| Trimellitic anhydride (0.01 mol; 4.0 mol % based on the total number of moles of polyvalent carboxylic acid), and | 3.0 parts |
| tert-butyl catechol (polymerization inhibitor) | 0.1 parts. |

Then, the abovementioned materials were added, the pressure inside the reaction vessel was reduced to 8.3 kPa, and the reaction was continued for 1 hour while maintaining the temperature at 180° C. After confirming that the softening point reached 90° C., the temperature was lowered to stop the reaction and obtain an amorphous polyester resin (L).

The amorphous polyester resin (L) thus obtained had a peak molecular weight (Mp) of 5500 and a softening point (Tm) of 90° C.

Production Example of Amorphous Polyester Resin (H)

| | |
|---|---|
| Polyoxypropylene (2.2)-2,2-bis(4-hydroxyphenyl)propane (0.20 mol; 100.0 mol % based on the total number of moles of polyhydric alcohol), | 72.3 parts |
| terephthalic acid (0.11 mol; 65.0 mol % with respect to the total number of moles of polyvalent carboxylic acid), | 18.3 parts |
| fumaric acid (0.03 mol; 15.0 mol % with respect to the total number of moles of polyvalent carboxylic acid), and | 2.9 parts |
| tin 2-ethylhexanoate (esterification catalyst) | 0.5 parts. |

The abovementioned materials were weighed into a reaction vessel equipped with a cooling tube, a stirrer, a nitrogen inlet tube, and a thermocouple.

Next, after purging the reaction vessel with nitrogen gas, the temperature was gradually raised under stirring, and the components were reacted for 2 hours under stirring at a temperature of 200° C.

Further, the pressure inside the reaction vessel was reduced to 8.3 kPa and maintained for 1 hour, followed by cooling to 180° C. and returning to atmospheric pressure.

| | |
|---|---|
| Trimellitic anhydride (0.03 mol; 20.0 mol % with respect to the total number of moles of polyvalent carboxylic acid), and | 6.5 parts |
| tert-butyl catechol (polymerization inhibitor) | 0.1 parts. |

Then, the abovementioned materials were added, the pressure inside the reaction vessel was reduced to 8.3 kPa, and the reaction was continued for 15 hours while maintaining the temperature at 160° C. After confirming that the softening point reached 137° C., the temperature was lowered to stop the reaction and obtain an amorphous polyester resin (H).

The amorphous polyester resin (H) thus obtained had a peak molecular weight (Mp) of 9000 and a softening point (Tm) of 137° C.

Production Example of Crystalline Polyester Resin (C)

| | |
|---|---|
| 1,6-Hexanediol (0.29 mol; 100.0 mol % based on the total number of moles of polyhydric alcohol), | 34.5 parts |
| dodecanedioic acid (0.28 mol; 100.0 mol % with respect to the total number of moles of polyvalent carboxylic acid), and | 65.5 parts |
| tin 2-ethylhexanoate | 0.5 parts. |

The abovementioned materials were weighed into a reaction vessel equipped with a cooling tube, a stirrer, a nitrogen inlet tube, and a thermocouple.

Next, after purging the reaction vessel with nitrogen gas, the temperature was gradually raised under stirring, and the components were reacted for 3 hours under stirring at a temperature of 140° C.

Further, the pressure inside the reaction vessel was reduced to 8.3 kPa, and the reaction was conducted for 4 hours while maintaining the temperature at 200° C.

The interior of the reaction vessel was then depressurized to not more than 5 kPa and a reaction was conducted or 3 hours at 200° C. to obtain a crystalline polyester resin (C).

Production Example of Toner 1

| | |
|---|---|
| Amorphous polyester resin (L) | 50.0 parts, |
| amorphous polyester resin (H) | 50.0 parts, |
| crystalline polyester resin (C) | 5.0 parts, |
| polymer 1 | 5.0 parts, |
| Fischer-Tropsch wax (hydrocarbon wax, peak temperature of the maximum endothermic peak at 90° C.), | 5.0 parts |
| C.I. Pigment Blue 15:3 | 7.0 parts, and |
| 3,5-di-t-butylsalicylic acid aluminum compound | 0.3 parts |

(Bontron E 88 manufactured by Orient Chemical Industries, Ltd.).

The abovementioned materials were mixed at a rotation speed of 20 $s^{-1}$ and for a rotation time of 5 minutes by using a Henschel mixer (Model FM-75, manufactured by Mitsui Mining Co., Ltd.), and then melt-kneaded in a twin-screw kneader (PCM-30 type, manufactured by Ikegai Corp). The barrel temperature during melt-kneading was set such that the outlet temperature of the melt-kneaded product was 115° C. The outlet temperature of the melt-kneaded product was directly measured using a handy type thermometer HA-200E manufactured by Anritsu Meter Co., Ltd.

The obtained melt-kneaded product was cooled and coarsely pulverized to not more than 1 mm with a hammer mill to obtain a coarsely pulverized product. The obtained coarsely pulverized product was finely pulverized with a mechanical pulverizer (T-250, manufactured by Turbo Kogyo Co., Ltd.). Further, classification was carried out using Faculty F-300 (manufactured by Hosokawa Micron Corporation) to obtain resin particles. The operating conditions of Faculty F-300 were set as follows: classification rotor rotation speed 130 $s^{-1}$ and dispersion rotor rotation speed 120 $s^{-1}$.

Using the obtained resin particles, heat treatment was performed with the heat treatment apparatus shown in the FIGURE to obtain toner particles. The operating conditions were set as follows. Feed rate: 5 kg/hr, hot air temperature: 150° C., hot air flow rate: 6 $m^3$/min, cold air temperature: −5° C., cold air flow rate: 4 $m^3$/min, blower air volume: 20 $m^3$/min, and injection air flow rate: 1 $m^3$/min.

A total of 1.0 part of hydrophobic silica (BET: 200 $m^2/g$) and 1.0 part of fine titanium oxide particles (BET: 80 $m^2/g$) surface-treated with isobutyltrimethoxysilane were mixed with 100 parts of toner particles by using a Henschel mixer (FM-75 type, manufactured by Mitsui Mining Co., Ltd.) at a rotation speed of 30 $s^{-1}$ for a rotation time of 10 minutes to prepare toner 1.

Production Example of Toners 2 to 33

Toners 2 to 33 were obtained by performing the same operations as in Production Example of Toner 1, except that the conditions were appropriately changed so that the addition amount of the crystalline polyester resin (C), the type and addition amount of the polymer, the outlet temperature, and the heat treatment that were used in Production Example of Toner 1 were changed as shown in Table 2. The production conditions of the toners are shown in Table 2.

TABLE 2

| Toner No. | Number of added parts of crystalline polyester resin (parts by mass) | Polymer Type | Polymer Softening point (° C.) [Tm] | Polymer Number of added parts (parts by mass) | Outlet temperature of kneaded product (° C.) [Tk] | Tk − Tm | Heat treatment |
|---|---|---|---|---|---|---|---|
| 1 | 5.0 | Polymer 1 | 115.0 | 5.0 | 115.0 | 0.0 | Yes |
| 2 | 5.0 | Polymer 1 | 115.0 | 2.0 | 115.0 | 0.0 | Yes |
| 3 | 5.0 | Polymer 1 | 115.0 | 8.0 | 115.0 | 0.0 | Yes |
| 4 | 5.0 | Polymer 2 | 115.0 | 5.0 | 115.0 | 0.0 | Yes |
| 5 | 5.0 | Polymer 3 | 115.0 | 5.0 | 115.0 | 0.0 | Yes |
| 6 | 5.0 | Polymer 4 | 115.0 | 5.0 | 115.0 | 0.0 | Yes |
| 7 | 5.0 | Polymer 5 | 115.0 | 5.0 | 115.0 | 0.0 | Yes |
| 8 | 5.0 | Polymer 6 | 115.0 | 5.0 | 115.0 | 0.0 | Yes |
| 9 | 5.0 | Polymer 7 | 105.0 | 5.0 | 105.0 | 0.0 | Yes |
| 10 | 5.0 | Polymer 8 | 125.0 | 5.0 | 125.0 | 0.0 | Yes |
| 11 | 5.0 | Polymer 7 | 105.0 | 5.0 | 115.0 | 10.0 | Yes |
| 12 | 5.0 | Polymer 8 | 125.0 | 5.0 | 115.0 | −10.0 | Yes |
| 13 | 5.0 | Polymer 1 | 115.0 | 5.0 | 110.0 | −5.0 | Yes |

TABLE 2-continued

| Toner No. | Number of added parts of crystalline polyester resin (parts by mass) | Polymer Type | Softening point (° C.) [Tm] | Number of added parts (parts by mass) | Outlet temperature of kneaded product (° C.) [Tk] | Tk − Tm | Heat treatment |
|---|---|---|---|---|---|---|---|
| 14 | 5.0 | Polymer 1 | 115.0 | 5.0 | 125.0 | 10.0 | Yes |
| 15 | 5.0 | Polymer 1 | 115.0 | 5.0 | 115.0 | 0.0 | — |
| 16 | — | Polymer 1 | 115.0 | 5.0 | 115.0 | 0.0 | Yes |
| 17 | 5.0 | Polymer 1 | 115.0 | 0.5 | 115.0 | 0.0 | Yes |
| 18 | 5.0 | Polymer 1 | 115.0 | 12.0 | 115.0 | 0.0 | Yes |
| 19 | 5.0 | Polymer 9 | 115.0 | 5.0 | 115.0 | 0.0 | Yes |
| 20 | 5.0 | Polymer 10 | 115.0 | 5.0 | 115.0 | 0.0 | Yes |
| 21 | 5.0 | Polymer 11 | 115.0 | 5.0 | 115.0 | 0.0 | Yes |
| 22 | 5.0 | Polymer 12 | 115.0 | 5.0 | 115.0 | 0.0 | Yes |
| 23 | 5.0 | Polymer 13 | 115.0 | 5.0 | 115.0 | 0.0 | Yes |
| 24 | 5.0 | Polymer 14 | 115.0 | 5.0 | 115.0 | 0.0 | Yes |
| 25 | 5.0 | Polymer 15 | 115.0 | 5.0 | 115.0 | 0.0 | Yes |
| 26 | 5.0 | Polymer 16 | 115.0 | 5.0 | 115.0 | 0.0 | Yes |
| 27 | 5.0 | Polymer 17 | 95.0 | 5.0 | 105.0 | 10.0 | Yes |
| 28 | 5.0 | Polymer 18 | 130.0 | 5.0 | 115.0 | −15.0 | Yes |
| 29 | — | Polymer 19 | 115.0 | 5.0 | 115.0 | 0.0 | — |
| 30 | — | Polymer 20 | 135.0 | 5.0 | 115.0 | −20.0 | — |
| 31 | — | Polymer 21 | 115.0 | 5.0 | 95.0 | −20.0 | — |
| 32 | — | Polymer 21 | 115.0 | 5.0 | 130.0 | 15.0 | — |
| 33 | — | Polymer 22 | 135.0 | 0.5 | 105.0 | −30.0 | — |

Production Example of Magnetic Core Particle 1

Step 1 (Weighing and Mixing Step):

| $Fe_2O_3$ | 62.7 parts, |
| $MnCO_3$ | 29.5 parts, |
| $Mg(OH)_2$ | 6.8 parts, |
| $SrCO_3$ | 1.0 part. |

Ferrite raw materials listed hereinabove were weighed to obtain the abovementioned composition ratio. The components were then pulverized and mixed for 5 hours with a dry vibration mill using stainless steel beads having a diameter of ⅛ inches.

Step 2 (Pre-Calcination Step):

The pulverized product thus obtained was molded into square pellets with a side of about 1 mm with a roller compactor. The pellets were treated to remove a coarse powder with a vibrating sieve having an opening of 3 mm, then fine powder was removed with a vibration sieve having an opening of 0.5 mm, and then calcination was performed for 4 hours at a temperature of 1000° C. under a nitrogen atmosphere (oxygen concentration: 0.01% by volume) in a burner type calcination furnace to prepare calcined ferrite. The composition of the obtained calcined ferrite is presented below.

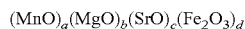

$$(MnO)_a(MgO)_b(SrO)_c(Fe_2O_3)_d$$

In the above formula, a=0.257, b=0.117, c=0.007, and d=0.393

Step 3 (Pulverizing Step):

After pulverization to about 0.3 mm with a crusher, 30 parts of water was added to 100 parts of the pre-calcined ferrite, and pulverization using ⅛-inch diameter zirconia beads was performed for 1 hour with a wet ball mill. The slurry was pulverized with a wet ball mill using alumina beads having a diameter of 1/16 inches for 4 hours to obtain ferrite slurry (finely pulverized product of pre-calcined ferrite).

Step 4 (Granulation Step):

A total of 1.0 part of ammonium polycarboxylate as a dispersant and 2.0 parts of polyvinyl alcohol as a binder were added to the ferrite slurry per 100 parts of the pre-calcined ferrite, followed by granulation into spherical particles with a spray drier (manufacturer: Ohkawara Kakohki Co., Ltd.). The obtained particles were adjusted in particle size and then heated for 2 hours at 650° C. by using a rotary kiln to remove organic components of the dispersant and the binder.

Step 5 (Calcination Step):

In order to control the calcination atmosphere, the temperature was raised over 2 hours from room temperature to a temperature of 1300° C. in a nitrogen atmosphere (oxygen concentration 1.00% by volume) in an electric furnace, followed by calcination for 4 hours at a temperature of 1150° C. The temperature was then lowered over 4 hours to 60° C., the atmosphere was returned from the nitrogen atmosphere to that of the air, and the product was taken out at a temperature of not more than 40° C.

Step 6 (Screening Process):

After crushing the agglomerated particles, the products with a low magnetic force were cut by magnetic separation and coarse particles were removed by sieving with a 250 μm mesh sieve to obtain magnetic core particles 1 with a 50% particle diameter (D50), based on a volume distribution standard, of 37.0 μm.

<Preparation of Coating Resin 1>

| Cyclohexyl methacrylate monomer | 26.8% by mass, |
| methyl methacrylate monomer | 0.2% by mass, |
| methyl methacrylate macromonomer (macromonomer having a methacryloyl group at one end and a weight average molecular weight of 5000), | 8.4% by mass |
| toluene | 31.3% by mass, |
| methyl ethyl ketone | 31.3% by mass, |
| azobisisobutyronitrile | 2.0% by mass. |

Of the abovementioned materials, the cyclohexyl methacrylate monomer, methyl methacrylate monomer, methyl methacrylate macromonomer, toluene and methyl ethyl ketone were placed in a four-necked separable flask equipped with a reflux condenser, a thermometer, a nitrogen introducing tube, and a stirrer. Nitrogen gas was introduced to obtain a fully nitrogen atmosphere, followed by heating to 80° C. Then, azobisisobutyronitrile was added, followed by refluxing for 5 hours and polymerization. Hexane was injected into the resultant reaction product to cause sedimentation and precipitation of the copolymer, and the precipitate was filtered off and vacuum-dried to obtain a coating resin 1.

A total of 30 parts of the coating resin 1 thus obtained was dissolved in 40 parts of toluene and 30 parts of methyl ethyl ketone to obtain a polymer solution 1 (amount of solids was 30% by mass).

<Preparation of Coating Resin Solution 1>

| | |
|---|---|
| Polymer solution 1 (concentration of resin solids 30%) | 33.3% by mass, |
| toluene | 66.4% by mass, and |
| carbon black (Regal 330; manufactured by Cabot Corporation) | 0.3% by mass |

(primary particle diameter 25 nm, nitrogen adsorption specific surface area 94 m²/g, and DBP oil absorption amount 75 mL/100 g) were dispersed for 1 hours with a paint shaker using zirconia beads having a diameter of 0.5 mm. The obtained dispersion was filtered with a 5.0 μm membrane filter to obtain a coating resin solution 1.

Production Example of Magnetic Carrier 1

(Resin Coating Step):

The coating resin solution 1 was loaded into a vacuum degassing type kneader maintained at room temperature in an amount of 2.5 parts as a resin component with respect to 100 parts of the magnetic core particles 1. After loading, the mixture was stirred for 15 minutes at a rotation speed of 30 rpm. After the solvent was volatilized to at least a certain level (80% by mass), the temperature was raised to 80° C. while mixing under reduced pressure, and toluene was distilled off over 2 hours, followed by cooling.

The obtained magnetic carrier was classified to cut the products with a low magnetic force by magnetic separation, passed through a sieve having an opening of 70 μm, and classified with an air classifier to obtain a magnetic carrier 1 with a 50% particle diameter (D50), based on a volume distribution standard, of 38.2 μm.

The toners 1 to 34 were added to the magnetic carrier 1 so that the toner concentration became 8.0% by mass, and the components were mixed using a V type mixer (V-10 type: Tokuju Corporation) under the conditions of 0.5 s⁻¹ and a rotation time of 5 minutes to obtain two-component developers 1 to 34.

Examples 1 to 28 and Comparative Examples 1 to 5

Evaluation was carried out using the two-component developers 1 to 33.

A Canon printer imageRUNNER ADVANCE C5051 for digital commercial printing was used as an image forming apparatus and was modified so that the fixing temperature and process speed could be freely set. A two-component type developer was placed in the developing device at the cyan position of this modified machine, and the DC voltage $V_{DC}$ of the developer carrying member, the charging voltage $V_D$ of the electrostatic latent image bearing member, and the laser power were adjusted to obtain the desired amount of the toner on the electrostatic latent image bearing member or paper, and the below-described evaluations were carried out. The results are shown in Table 3.

<Evaluation 1: Tinting Strength>

The printing speed of the image forming apparatus was made 1.5 times the normal printing speed (A4 lateral feed 76.5 prints/min).

The evaluation environment was set to normal temperature and normal humidity (23° C., 50% RH), and paper CS-814 for copiers (A4, basis weight 81.4 g/m², marketed by Canon Marketing Japan Inc.) was used as evaluation paper.

The relationship between the image density and the amount of applied toner on the paper was examined by changing the toner loading amount on the paper in the evaluation environment.

Next, the image density of an FFH image (solid portion) was adjusted to 1.55, and the amount of applied toner when the image density became 1.55 was determined.

The FFH image refers to a value obtained by representing 256 tone levels in a hexadecimal notation, and is such an image that 00H represents the first tone level (white portion) and FFH represents the 256-th tone level (solid portion).

The image density was measured using an X-Rite color reflection densitometer (500 series: manufactured by X-Rite Incorporated).

The tinting strength of the toner was evaluated from the applied toner amount (mg/cm²) according to the following criteria. When the evaluation was A to C, it was determined that the effect of the present invention was obtained.

(Evaluation Criteria)
A: less than 0.45,
B: at least 0.45 and less than 0.55,
C: at least 0.55 and less than 0.65,
D: at least 0.65.

<Evaluation 2: Hot Offset Resistance>
Paper: CS-680 (68.0 g/m²)
(marketed by Canon Marketing Japan Inc.)
Applied toner amount: 0.08 mg/cm²
Evaluation image: an image of 10 cm² placed at both ends of the paper
Fixing test environment: normal-temperature low-humidity environment, temperature 23° C./humidity 5% RH (hereinafter "N/L")

The process speed of the image forming apparatus was set at 450 mm/sec and the fixing temperature was increased by 5° C. from 150° C. to evaluate hot offset resistance.

The evaluation procedure involved passing 10 plain postcards at the center position of the fixing belt of the fixing device of the image forming apparatus and then outputting the fixed image under the abovementioned conditions.

The fogging value of the fixed image was used as an evaluation index of hot offset resistance.

Fogging was calculated by measuring an average reflectance Dr (%) of the evaluation paper before image formation and a reflectance Ds (%) of a white background portion after the fixing test with a reflectometer ("REFLECTOMETER MODEL TC-6DS" manufactured by Tokyo Denshoku Co., Ltd.) and using the following equation. The fogging thus obtained was evaluated according to the following evaluation criteria. When the evaluation was A to C, it was determined that the effect of the present invention was obtained.

Fogging (%)=$Dr$(%)−$Ds$(%)

(Evaluation Criteria)
A: less than 0.2%,
B: at least 0.2% and less than 0.5%,
C: at least 0.5% and less than 1.0%,
D: at least 1.0%.

<Evaluation 3: Charging Performance Under High-Temperature and High-Humidity Environment>

The toner on the electrostatic latent image bearing member was sucked in and collected by using a metal cylindrical tube and a cylindrical filter to calculate the triboelectric charge quantity and the applied toner amount of the toner.

Specifically, the triboelectric charge quantity and the applied toner amount on the electrostatic latent image bearing member were measured with a Faraday cage.

The Faraday cage, as referred to herein, is a coaxial double cylinder in which the inner cylinder and the outer cylinder are insulated from each other. Where a charged body with a charge amount Q is inserted in the inner cylinder, it is as if a metal cylinder with a charge amount Q is present due to electrostatic induction. The induced charge amount was measured with an electrometer (KEITHLEY 6517A, manufactured by Keithley Instruments Inc.), and the ratio (Q/M) obtained by dividing the charge amount Q (mC) by the mass M (kg) of the toner in the inner cylinder was taken as the triboelectric charge quantity of the toner.

Further, the suction area S was measured and the applied toner amount per unit area was obtained by dividing the toner mass M by the suction area S (cm$^2$).

The rotation of the electrostatic latent image bearing member was stopped before the toner layer formed on the electrostatic latent image bearing member was transferred to the intermediate transfer member, and the toner image on the electrostatic latent image bearing member was directly measured by air suction.

Applied toner amount (mg/cm$^2$)=$M/S$

Triboelectric charge quantity of the toner (mC/kg)=$Q/M$

The applied toner amount on the electrostatic latent image bearing member under a high-temperature and high-humidity environment (32.5° C., 80% RH) in the image forming apparatus was adjusted to 0.35 mg/cm$^2$, and the toner was collected by suction with the metal cylindrical tube and cylindrical filter. In this case, the charge amount Q accumulated at the capacitor through the metal cylindrical tube and the mass M of the collected toner were measured and the charge amount Q/M (mC/kg) per unit mass was calculated and taken as the charge amount Q/M (mC/kg) per unit mass on the electrostatic latent image bearing member. When the evaluation based on the following evaluation criteria was A to C, it was determined that the effect of the present invention was obtained.

(Evaluation Criteria)
A: Q/M is at least 36.0 mC/kg.
B: Q/M is at least 33.0 mC/kg and less than 36.0 mC/kg.
C: Q/M is at least 30.0 mC/kg and less than 33.0 mC/kg.
D: Q/M is less than 30.0 mC/kg.

<Evaluation 4: Charge Retention Property Under High-Temperature and High-Humidity Environment>

After evaluating the charging performance, the developing device was removed from the apparatus and allowed to stand for 72 hours under a high-temperature and high-humidity environment (32.5° C., 80% RH). The developing device was then again mounted on the apparatus, and the charge amount Q/M per unit mass on the electrostatic latent image bearing member was measured with the same DC voltage $V_{DC}$ as was used in the evaluation of charging performance.

The Q/M per unit mass on the electrostatic latent image bearing member in the evaluation of charging performance was taken as 100%, and the retention ratio of the charge amount Q/M per unit mass on the electrostatic latent image bearing member after the device was allowed to stand for 72 hours ([(Q/M of evaluation after the device was allowed to stand)/(Q/M of evaluation of charging performance)]×100) was calculated and determined according to the following criteria. When the evaluation was A to C, it was determined that the effect of the present invention was obtained.

(Evaluation Criteria)
A: Retention ratio is at least 90%.
B: Retention ratio is at least 85% and less than 90%.
C: Retention ratio is at least 80% and less than 85%.
D: Retention ratio is less than 80%.

<Evaluation 5: Low-Temperature Fixability>
Paper: CS-680 (68.0 g/m$^2$)
(marketed by Canon Marketing Japan Inc.)
Applied toner amount: 1.20 mg/cm$^2$
Evaluation image: an image of 10 cm$^2$ arranged at the center of the paper
Fixing test environment: low-temperature low-humidity environment, 15° C./10% RH (hereinafter "L/L")

The DC voltage $V_{DC}$ of the developer carrying member, the charging voltage $V_D$ of the electrostatic latent image bearing member, and the laser power were adjusted to obtain the abovementioned amount of the toner on the paper, the process speed was then set to 450 mm/sec, the fixing temperature was set at 130° C., and low-temperature fixability was evaluated.

The value of an image density reduction ratio was used as an evaluation index of the low-temperature fixability.

To determine the image density reduction ratio, first, the density of the fixed image in the center portion was measured using an X-Rite color reflection densitometer (500 series: manufactured by X-Rite Incorporated). Next, the fixed image was rubbed (5 times in a reciprocating manner) with Silbon paper by applying a load of 4.9 kPa (50 g/cm$^2$) to the portion where the density of the fixed image was measured, and the density of the fixed image was measured again. Then, the reduction ratio (%) of the density of the fixed image before and after rubbing was measured. When the evaluation based on the following evaluation criteria was A to C, it was determined that the effect of the present invention was obtained.

(Evaluation Criteria)
A: density reduction ratio is less than 1.5%.
B: density reduction ratio is at least 1.5% and less than 2.0%.
C: density reduction ratio is at least 2.0% and less than 3.0%.
D: density reduction ratio is at least 3.0%.

<Evaluation 6: Blocking Resistance>

A total of 5 g of toner was placed in a 100 mL plastic container and allowed to stand for 48 hours in a thermostat with variable temperature and humidity (settings: 55° C., 41% RH). Then, agglomeration property of the toner was evaluated.

The agglomeration property was evaluated by using the residual ratio of the remaining toner as an evaluation criterion when sieving for 10 seconds with a powder tester PT-X manufactured by Hosokawa Micron Corporation at an amplitude of 0.5 mm with a mesh opening of 20 μm. When the evaluation was A to C, it was determined that the effect of the present invention was obtained.

(Evaluation Criteria)
A: residual ratio is less than 2.0%.
B: residual ratio is at least 2.0% and less than 10.0%.
C: residual ratio is at least 10.0% and less than 15.0%.
D: residual ratio is at least 15.0%.

TABLE 3

| | Toner No. | Evaluation 1 Rank | Tinting strength | Evaluation 2 Hot offset resistance Rank | | Evaluation 3 Rank | Charging performance | Evaluation 4 Charge retention property Rank | | Evaluation 5 Low temp. fixability Rank | | Evaluation 6 Rank | Blocking resistance |
|---|---|---|---|---|---|---|---|---|---|---|---|---|---|
| Example 1 | 1 | A | 0.20 | A | 0.0 | A | 40.0 | A | 98 | A | 0.3 | A | 0.2 |
| Example 2 | 2 | A | 0.23 | B | 0.3 | A | 39.5 | A | 98 | A | 0.5 | B | 2.6 |
| Example 3 | 3 | A | 0.23 | A | 0.0 | A | 39.5 | A | 97 | B | 1.6 | A | 0.8 |
| Example 4 | 4 | A | 0.24 | A | 0.1 | B | 35.5 | A | 97 | A | 0.5 | B | 2.6 |
| Example 5 | 5 | A | 0.27 | B | 0.3 | A | 38.5 | A | 96 | A | 0.4 | A | 0.6 |
| Example 6 | 6 | A | 0.24 | A | 0.0 | A | 38.5 | A | 97 | B | 1.7 | A | 0.8 |
| Example 7 | 7 | A | 0.30 | A | 0.0 | A | 38.0 | A | 96 | B | 1.8 | A | 0.8 |
| Example 8 | 8 | A | 0.32 | A | 0.1 | A | 38.5 | A | 92 | C | 2.3 | A | 1.0 |
| Example 9 | 9 | A | 0.30 | B | 0.3 | A | 38.0 | A | 95 | A | 0.9 | B | 3.4 |
| Example 10 | 10 | B | 0.47 | A | 0.1 | A | 38.0 | A | 94 | B | 1.7 | A | 1.0 |
| Example 11 | 11 | A | 0.31 | A | 0.1 | A | 37.5 | B | 87 | A | 0.5 | B | 4.6 |
| Example 12 | 12 | C | 0.56 | B | 0.3 | A | 38.0 | A | 95 | A | 0.8 | A | 0.8 |
| Example 13 | 13 | A | 0.31 | B | 0.4 | A | 37.5 | A | 94 | A | 0.9 | A | 1.0 |
| Example 14 | 14 | C | 0.59 | A | 0.1 | A | 37.5 | A | 96 | A | 1.0 | A | 1.4 |
| Example 15 | 15 | A | 0.31 | A | 0.1 | B | 35.5 | C | 82 | A | 0.8 | C | 11.2 |
| Example 16 | 16 | A | 0.32 | A | 0.1 | A | 37.5 | A | 94 | C | 2.6 | A | 1.6 |
| Example 17 | 17 | A | 0.27 | C | 0.5 | A | 36.5 | A | 95 | A | 1.1 | C | 12.8 |
| Example 18 | 18 | A | 0.25 | A | 0.1 | A | 37.0 | A | 91 | C | 2.5 | A | 1.6 |
| Example 19 | 19 | A | 0.31 | A | 0.1 | C | 32.5 | A | 93 | A | 0.6 | C | 13.8 |
| Example 20 | 20 | A | 0.36 | C | 0.6 | A | 36.5 | A | 96 | A | 0.8 | A | 1.2 |
| Example 21 | 21 | A | 0.41 | C | 0.6 | A | 37.0 | A | 93 | A | 0.9 | B | 5.6 |
| Example 22 | 22 | A | 0.39 | A | 0.1 | B | 35.5 | B | 87 | A | 1.0 | B | 5.8 |
| Example 23 | 23 | A | 0.38 | A | 0.1 | B | 34.0 | B | 86 | A | 0.7 | B | 5.6 |
| Example 24 | 24 | A | 0.29 | A | 0.1 | C | 32.5 | C | 82 | A | 0.9 | B | 6.8 |
| Example 25 | 25 | A | 0.32 | A | 0.1 | C | 31.5 | C | 81 | A | 1.0 | B | 7.0 |
| Example 26 | 26 | A | 0.42 | A | 0.1 | A | 36.5 | A | 93 | C | 2.5 | B | 7.8 |
| Example 27 | 27 | A | 0.32 | A | 0.1 | A | 37.0 | C | 83 | A | 1.1 | B | 8.0 |
| Example 28 | 28 | C | 0.58 | C | 0.8 | A | 36.5 | A | 93 | A | 1.2 | C | 14.2 |
| Comparative example 1 | 29 | A | 0.32 | A | 0.1 | D | 29.0 | D | 78 | D | 3.1 | D | 15.8 |
| Comparative example 2 | 30 | C | 0.59 | D | 1.4 | D | 28.5 | D | 77 | D | 3.2 | C | 14.6 |
| Comparative example 3 | 31 | D | 0.68 | D | 1.6 | D | 29.0 | D | 78 | D | 3.4 | D | 15.8 |
| Comparative example 4 | 32 | D | 0.67 | D | 1.7 | D | 28.0 | D | 75 | D | 3.2 | D | 16.6 |
| Comparative example 5 | 33 | D | 0.75 | D | 1.8 | D | 26.5 | D | 68 | D | 3.8 | D | 18.4 |

A polymer 19 used in a toner 29 of Comparative Example 1 did not contain a monomer unit derived from cycloalkyl (meth)acrylate, and the low-temperature fixability, charging performance, charge retention property, and blocking resistance were in unacceptable ranges.

A polymer 20 used in a toner 30 of Comparative Example 2 had no monomer unit derived from α-methylstyrene. As a result, the softening point of the polymer was high, the relationship $-18 \leq [Tk-Tm] \leq 10$ was not satisfied, wax dispersibility decreased, and the low-temperature fixability, hot offset resistance, charging performance, and charge retention property were in unacceptable ranges.

A toner 31 of Comparative Example 3 used a polymer 21 and the temperature of the kneaded product during kneading was 95° C. In this case, the relationship $-18 \leq [Tk-Tm] \leq 10$ was not satisfied, and the tinting strength, low-temperature fixability, hot offset resistance, blocking resistance, charging performance, and charge retention property were in unacceptable ranges.

When a toner 32 of Comparative Example 4 was produced, the relationship $-18 \leq [Tk-Tm] \leq 10$ was not satisfied, and the tinting strength, low-temperature fixability, hot offset resistance, blocking resistance, charging performance, and charge retention property were in unacceptable ranges.

When a toner 33 of Comparative Example 5 was produced, the relationship $-18 \leq [Tk-Tm] \leq 10$ was not satisfied, and the tinting strength, hot offset resistance, blocking resistance, low-temperature fixability, charging performance, and charge retention property were in unacceptable ranges.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-159640, filed, Aug. 16, 2016, which is hereby incorporated by reference herein in its entirety.

What is claimed is:

1. A toner production method comprising:
   a melt-kneading step of melt-kneading a resin composition including a binder resin, a colorant, a wax, and a wax dispersant to obtain a melt-kneaded product; and
   a pulverizing step of pulverizing the melt-kneaded product, wherein
   $-18 \leq [Tk-Tm] \leq 10$ where a temperature of the melt-kneaded product at an end of the melt-kneading step is Tk (° C.), and a softening point of the wax dispersant is Tm (° C.), the wax dispersant is a polymer in which a styrene acrylic polymer is grafted to a polyolefin, the styrene acrylic polymer has a monomer unit derived from α-methylstyrene and a monomer unit derived from a cycloalkyl (meth)acrylate, the monomer unit derived from the cycloalkyl (meth)acrylate is represented by formula (2)

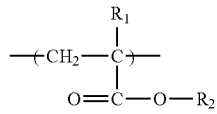
(2)

where $R_1$ represents a hydrogen atom or a methyl group, and $R_2$ represents a cycloalkyl group, and the monomer unit derived from α-methylstyrene is represented by formula (4)

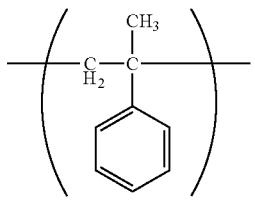
(4)

2. The toner production method according to claim 1, wherein an amount of the monomer unit derived from α-methylstyrene in the polymer is 5.0 to 30.0% by mass.

3. The toner production method according to claim 1, wherein the softening point of the wax dispersant is 100.0 to 130.0° C.

4. The toner production method according to claim 1, wherein the styrene acrylic polymer further has a monomer unit represented by formula (3)

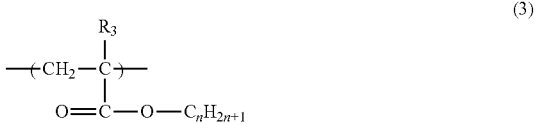
(3)

where $R_3$ represents a hydrogen atom or a methyl group, and n represents an integer of 1 to 18.

5. The toner production method according to claim 1, wherein the monomer unit derived from the cycloalkyl (meth)acrylate is derived from cyclohexyl methacrylate.

6. The toner production method according to claim 1, wherein the polyolefin is polypropylene having a melting point of 70 to 90° C.

7. The toner production method according to claim 1, wherein the amount of the polymer is 1.0 to 10.0 parts by mass with respect to 100 parts by mass of the binder resin.

* * * * *